US012597416B1

(12) United States Patent
Solh et al.

(10) Patent No.: US 12,597,416 B1
(45) Date of Patent: Apr. 7, 2026

(54) MULTI-BRANCHED NETWORK FOR EVENT DETECTION

(71) Applicant: Amazon Technologies, Inc., Seattle, WA (US)

(72) Inventors: Mashhour Solh, San Jose, CA (US); Ameya Patil, Sunnyvale, CA (US); Steven Sensarn, Milpitas, CA (US)

(73) Assignee: Amazon Technologies, Inc., Seattle, WA (US)

( * ) Notice: Subject to any disclaimer, the term of this patent is extended or adjusted under 35 U.S.C. 154(b) by 304 days.

(21) Appl. No.: 18/216,934

(22) Filed: Jun. 30, 2023

(51) Int. Cl.
  *G10L 15/02* (2006.01)
  *G10L 15/16* (2006.01)
  *G10L 15/22* (2006.01)

(52) U.S. Cl.
  CPC .............. *G10L 15/16* (2013.01); *G10L 15/22* (2013.01); *G10L 2015/223* (2013.01)

(58) Field of Classification Search
  None
  See application file for complete search history.

(56) References Cited

U.S. PATENT DOCUMENTS

| | | | |
|---|---|---|---|
| 6,470,142 B1 | 10/2002 | Isozaki et al. | |
| 8,441,790 B2 | 5/2013 | Pance et al. | |
| 8,705,382 B2 | 4/2014 | Bonta et al. | |
| 9,042,571 B2 | 5/2015 | Dickins et al. | |
| 9,104,272 B2 | 8/2015 | Klinghult et al. | |

| | | | |
|---|---|---|---|
| 9,317,120 B2 | 4/2016 | Rank et al. | |
| 9,557,911 B2 | 1/2017 | Wallace et al. | |
| 9,699,581 B2 | 7/2017 | Partio et al. | |
| 9,811,555 B2 | 11/2017 | Mitri et al. | |
| 9,894,393 B2 | 2/2018 | Petersen et al. | |
| 9,974,478 B1 * | 5/2018 | Brokaw ................. | A61B 5/486 |
| 10,452,099 B2 | 10/2019 | Isherwood | |
| 10,504,506 B2 * | 12/2019 | Yoo ......................... | G06N 3/045 |
| 10,802,790 B2 | 10/2020 | Itoh et al. | |
| 10,911,881 B1 * | 2/2021 | Bulek .................... | H04R 3/005 |
| 11,044,567 B1 | 6/2021 | Li et al. | |
| 11,115,766 B1 | 9/2021 | Sinelnikov et al. | |
| 11,234,089 B2 | 1/2022 | Yan | |
| 11,302,342 B1 * | 4/2022 | Sensarn ................. | G10L 19/002 |
| 11,389,084 B2 * | 7/2022 | Zhang ..................... | G06F 1/163 |
| 11,528,571 B1 | 12/2022 | Liu et al. | |
| 11,551,681 B1 * | 1/2023 | Pandey .................. | G06N 5/022 |

(Continued)

*Primary Examiner* — Seong-Ah A Shin
(74) *Attorney, Agent, or Firm* — Pierce Atwood LLP

(57) ABSTRACT

A system that performs event detection using a multi-branched network for sensor fusion. For example, a device may detect when a tap event occurs on a surface of the device using a combination of microphone audio data and sensor data, such as motion data generated by a motion sensor. Prior to combining these inputs for further inference, the device may use separate neural networks to independently extract features from the audio data and the sensor data. This improves an accuracy of tap detection and enables detection of additional tap gestures and/or other types of event/activity detection, such as typing detection. The multi-branched network may generate fused data by processing audio features, motion data, raw audio data, raw accelerometer data, and/or additional sensor data. Depending on the inputs, a number of branches, a branch depth, and/or a number of event detectors may vary without departing from the disclosure.

20 Claims, 9 Drawing Sheets

(56)                    References Cited

U.S. PATENT DOCUMENTS

| 11,756,538 | B1 * | 9/2023 | Dell ........................ G10L 15/02 |
| | | | 704/232 |
| 12,263,009 | B1 * | 4/2025 | Giuffrida ............... G16H 20/17 |
| 2014/0225809 | A1 | 8/2014 | Fletcher et al. |
| 2019/0108832 | A1 * | 4/2019 | Tomar ................. G10L 15/1815 |
| 2019/0147855 | A1 * | 5/2019 | Zhao ........................ G10L 15/16 |
| | | | 704/232 |
| 2019/0385595 | A1 * | 12/2019 | Wabgaonkar ............ G06N 3/08 |
| 2020/0202846 | A1 * | 6/2020 | Bapna ................. G10L 15/1815 |
| 2020/0402507 | A1 * | 12/2020 | Neelakantan ........ G06N 3/0455 |
| 2021/0144499 | A1 | 5/2021 | Bulek et al. |
| 2022/0238102 | A1 * | 7/2022 | Lee ........................ G10L 15/02 |
| 2022/0246150 | A1 * | 8/2022 | Pust ........................ G08G 5/53 |
| 2023/0142339 | A1 * | 5/2023 | Getselevich ............ G10L 15/16 |
| | | | 704/275 |

* cited by examiner

Multi-Branched Fusion
370

FIG. 4

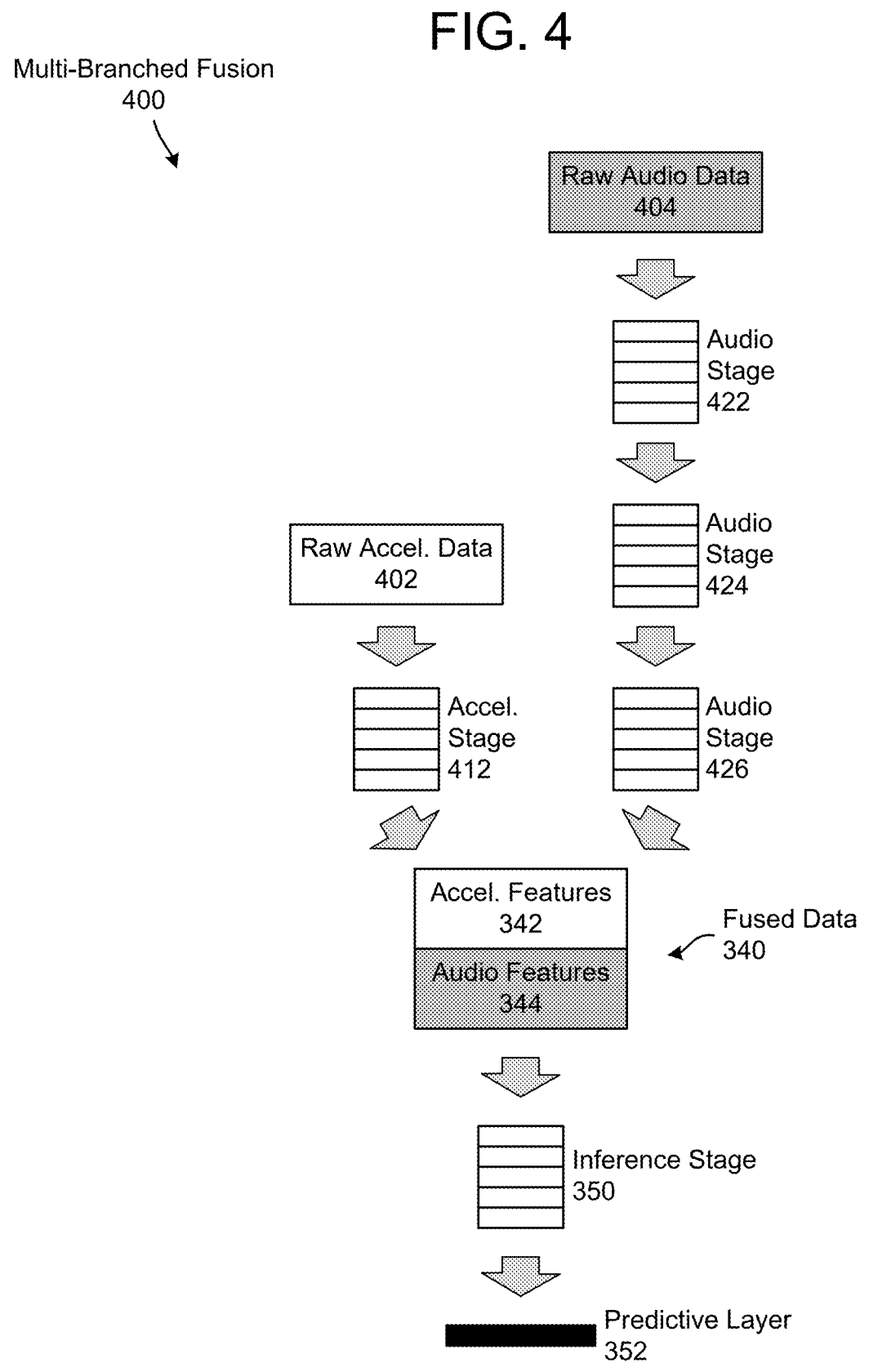

Multi-Branched Fusion
400

Raw Audio Data
404

Audio
Stage
422

Raw Accel. Data
402

Audio
Stage
424

Accel.
Stage
412

Audio
Stage
426

Accel. Features
342

Audio Features
344

Fused Data
340

Inference Stage
350

Predictive Layer
352

Multi-Branched Fusion
500

Sensor #3
Data
506

Sensor #2
Data
504

Sensor #3
Stage
530

Sensor #1
Data
502

Sensor #2
Stage
520

Sensor #3
Stage
532

Sensor #1
Stage
510

Sensor #2
Stage
522

Sensor #3
Stage
534

Sensor #1 Features
542

Sensor #2 Features
544

Sensor #3 Features
546

Fused Data
540

Task-Specific
Processing
550

FIG. 7

MULTI-BRANCHED NETWORK FOR EVENT DETECTION

BACKGROUND

With the advancement of technology, the use and popularity of electronic devices has increased considerably. Electronic devices are commonly used to capture and process audio data.

BRIEF DESCRIPTION OF DRAWINGS

For a more complete understanding of the present disclosure, reference is now made to the following description taken in conjunction with the accompanying drawings.

FIG. 4 illustrates an example component diagram for performing multi-branched fusion processing with different branch depth according to embodiments of the present disclosure.

FIG. 7 is a block diagram conceptually illustrating example components of a system for determining a distance and/or direction of an acoustically reflective surface according to embodiments of the present disclosure.

DETAILED DESCRIPTION

Electronic devices may be used to capture and process audio data. The audio data may be used for voice commands and/or may be output by loudspeakers as part of a communication session. In some examples, loudspeakers may generate audio using playback audio data while a microphone generates local audio data. While the device may process the audio data to identify a voice command and perform a corresponding action, processing the voice command may require complex processing and/or a delay while the audio data is sent to a remote system for speech processing.

To improve a user interface, devices, systems and methods are disclosed that detect when a tap event occurs on a surface of a device, along with other events/activity, using a multi-branched network for sensor fusion. For example, instead of using a physical sensor to detect the tap event, a device may detect a tap event using a combination of microphone audio data and sensor data, such as motion data generated by a motion sensor. Prior to combining these inputs for further inference, the device may use separate neural networks to independently extract features from the audio data and the sensor data. This multi-branch approach improves an accuracy of tap detection and enables detection of additional tap gestures and/or other types of event/activity detection (e.g., typing detection).

In some examples, the multi-branched network may generate fused data by processing audio features and motion data. In other examples, the multi-branched network may generate the fused data by processing raw audio data, raw accelerometer data, and/or additional sensor data. Depending on the inputs, a number of branches, a branch depth, and/or a number of event detectors may vary without departing from the disclosure. The device may process the fused data to detect a tap event and perform an action. For example, the device may interpret a detected tap event as an input to delay or end an alarm, turn a light switch on or off, turn music on or off, and/or the like, although the disclosure is not limited thereto. In some examples, the device may process the fused data using two or more event/activity detectors, enabling the device to detect multiple tap events, gestures, typing events, and/or the like based on a common input.

Figure 1:
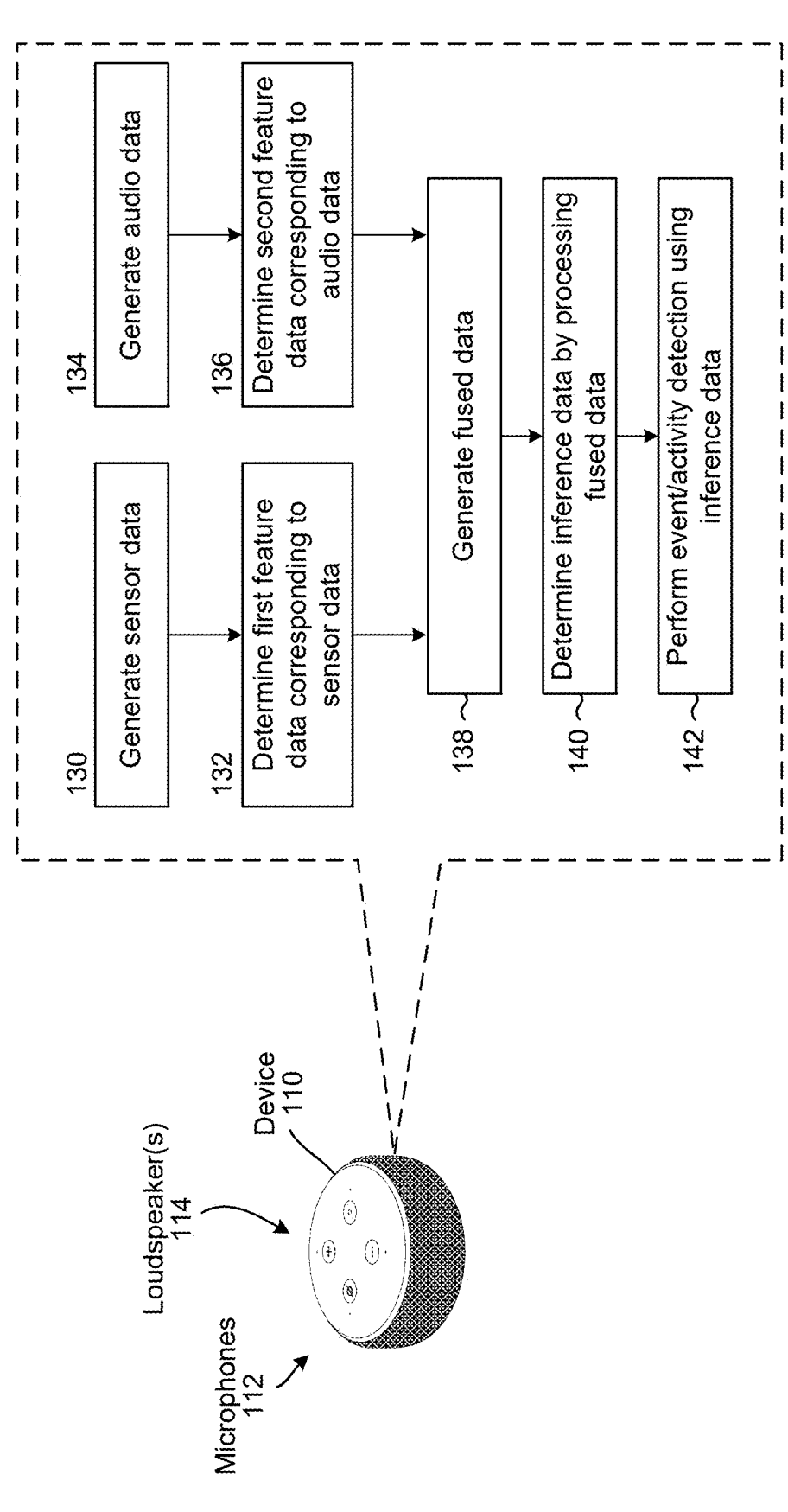
FIG. 1 illustrates a high-level conceptual block diagram of a system configured to perform multi-branched sensor fusion and event detection according to embodiments of the present disclosure.

FIG. 1 illustrates a high-level conceptual block diagram of a system 100 configured to perform multi-branched sensor fusion and event detection according to embodiments of the present disclosure. For example, the system may be configured to receive input data (e.g., audio data and/or sensor data), independently process the input data prior to generating fused data, and perform event detection using the fused data. Although FIG. 1, and other figures/discussion illustrate the operation of the system in a particular order, the steps described may be performed in a different order (as well as certain steps removed or added) without departing from the intent of the disclosure.

As illustrated in FIG. 1, a system 100 may include a device 110 that may include microphones 112 in a microphone array and/or one or more loudspeaker(s) 114. However, the disclosure is not limited thereto and the device 110 may include additional components without departing from the disclosure. While FIG. 1 illustrates the loudspeaker(s) 114 being internal to the device 110, the disclosure is not limited thereto and the loudspeaker(s) 114 may be external to the device 110 without departing from the disclosure. For example, the loudspeaker(s) 114 may be separate from the device 110 and connected to the device 110 via a wired connection and/or a wireless connection without departing from the disclosure.

The device 110 may be an electronic device configured to send audio data to a remote device (not illustrated) and/or generate output audio. For example, the device 110 may perform speech processing to interpret a voice command from a user 5 that is represented in audio data captured by the microphones 112. In some examples, the device 110 may send the audio data to a remote system to perform speech processing and may receive an indication to perform an action in response to the voice command.

To illustrate an example, the microphones 112 may generate microphone audio data $x_m(t)$ that may include a voice command, which may be indicated by a keyword (e.g., wakeword). For example, the device 110 detect that the wakeword is represented in the microphone audio data $x_m(t)$ and may cause language processing to be performed on the microphone audio data $x_m(t)$. Thus, a language processing component associated with the device 110 and/or a remote device may determine a voice command represented in the microphone audio data $x_m(t)$ and may perform an action corresponding to the voice command (e.g., execute a command, send an instruction to the device 110 and/or other devices to execute the command, etc.). In some examples, to determine the voice command the language processing component may perform Automatic Speech Recognition (ASR) processing, Natural Language Understanding (NLU) processing and/or command processing. The voice commands may control the device 110, audio devices (e.g., play music over loudspeaker(s) 114, capture audio using microphones 112, or the like), multimedia devices (e.g., play videos using a display, such as a television, computer, tablet or the like), smart home devices (e.g., change temperature controls, turn on/off lights, lock/unlock doors, etc.) or the like.

To detect user speech or other audio, the device 110 may use the microphones 112 to generate microphone audio data that captures audio in a room in which the device 110 is located (e.g., an environment of the device 110). As is known and as used herein, "capturing" an audio signal includes a microphone transducing audio waves (e.g., sound waves) of captured sound to an electrical signal and a codec digitizing the signal to generate the microphone audio data. In some examples, the microphones 112 may be included in a microphone array, such as an array of eight microphones. However, the disclosure is not limited thereto and the device 110 may include any number of microphones 112 without departing from the disclosure.

The device 110 may generate output audio corresponding to an alarm, corresponding to audio data stored on the device 110, and/or corresponding to audio data received from a remote device. For example, the device 110 may generate an alarm notification by sending alarm output audio data to the loudspeaker(s) 114. However, the disclosure is not limited thereto and the device 110 may receive playback audio data from a remote device and may generate output audio using the playback audio data.

To improve a user interface, the device 110 may detect when a tap event occurs on a surface of the device 110, along with other events/activity, using a multi-branched network for sensor fusion. For example, instead of using a physical sensor to detect the tap event, the device 110 may detect a tap event using a combination of microphone audio data and sensor data, such as motion data generated by a motion sensor (e.g., accelerometer). Prior to combining these inputs for further inference, the device 110 may use separate neural networks to independently extract features from the audio data and the sensor data. This multi-branch approach improves an accuracy of tap detection and enables detection of additional tap gestures and/or other types of event/activity detection (e.g., typing detection).

In some examples, the multi-branched network may generate fused data by processing audio features and motion data. In other examples, the multi-branched network may generate the fused data by processing raw audio data, raw accelerometer data, and/or additional sensor data. Depending on the inputs, a number of branches, a branch depth, and/or a number of event detectors may vary without departing from the disclosure. The device 110 may process the fused data to detect a tap event and perform an action. For example, the device 110 may interpret a detected tap event as an input to delay or end an alarm, turn a light switch on or off, turn music on or off, and/or the like, although the disclosure is not limited thereto.

Additionally or alternatively, the device 110 may process the fused data using two or more event/activity detectors, enabling the device 110 to detect multiple tap events, gestures, typing events, and/or the like based on a common input. In some examples, the device 110 may distinguish between multiple tap events based on a location of the tap event. For example, the device 110 may distinguish between a first location associated with a first microphone 112a and a second location associated with a second microphone 112b, enabling the device 110 to perform two separate actions depending on a location of the tap event.

As used herein, performing tap detection may refer to the device 110 applying a tap detection algorithm, detecting a tap event, detecting when a tap event occurs, detecting a physical interaction with the device, and/or the like without departing from the disclosure. For example, the device 110 may apply the tap detection algorithm to monitor for potential tap events and, in response to detecting a tap event, may generate event data indicating that the tap event occurred. Additionally or alternatively, performing event detection may refer to the device 110 applying an event detection algorithm, detecting an event/activity, detecting when an event/activity occurs, and/or the like without departing from the disclosure. In some examples, the device 110 may apply the event detection algorithm to monitor for potential events that may occur in an environment around the device 110, without physically interacting with the device 110 itself. For example, the device 110 may detect a typing event (e.g., user typing on a keyboard), detect mechanical operations (e.g., opening a door, operations performed by appliances, etc.), detect specific activity (e.g., chopping food in a kitchen), and/or the like, although the disclosure is not limited thereto.

Performing tap detection and/or event detection using only audio data may result in false positives, however. For example, loud noises in proximity to the device 110 (e.g., clapping, snapping, etc.), wind noise (e.g., caused by wind, a nearby fan, etc.), and/or other non-tap events may cause the device 110 to detect a tap event when no physical tap occurred. To reduce these false positives, the device 110 may perform tap detection and/or event detection using a combination of audio data and sensor data, such as motion data. For example, the device 110 may use both the audio data and the motion data to perform tap detection using a trained model, such as a machine learning model, neural network, convolutional neural network (CNN), deep neural network (DNN), transformer network, multilayer perceptron (MLP) network (e.g., fully connected network), feedforward artificial neural network, other architecture, and/or a combination thereof. Thus, in some examples the device 110 may only detect a tap event corresponding to motion of the device 110. For example, the tap event may correspond to a physical interaction with the device, comprising at least one of a swipe, tap, or button press, although the disclosure is not limited thereto.

As illustrated in FIG. 1, the device 110 may generate (130) sensor data and may determine (132) first feature data corresponding to the sensor data. For example, the device 110 may process the sensor data using a first neural network (e.g., first convolutional layers) to determine the first feature data. In some examples, the sensor data may correspond to accelerometer data (e.g., motion data) generated by an accelerometer component of the device 110 and may therefore represent motion of the device 110. However, the disclosure is not limited thereto, and in other examples the sensor data may correspond to other sensors without departing from the disclosure. Additionally or alternatively, the sensor data may correspond to multiple sensors and the device 110 may determine feature data independently for each sensor without departing from the disclosure.

Separately from determining the first feature data, the device 110 may generate (134) audio data corresponding to one or more microphones 112 and may determine (136) second feature data corresponding to the audio data. For example, the device 110 may process the audio data using a second neural network (e.g., second convolutional layers) to determine the second feature data, as described in greater detail below.

As used herein, unprocessed data generated by a sensor component may be referred to as raw data (e.g., raw sensor data, raw accelerometer data, raw audio data, etc.) and may correspond to a first series of values representing an input captured by the sensor component. In some examples, the device 110 may process the raw data to generate processed data, which may correspond to a second series of values representing the input similarly to the raw data. For example, raw audio data may include a first representation of speech and a first representation of noise and the device 110 may perform audio processing on the raw audio data to generate processed audio data that includes a second representation of the speech and a second representation of the noise, such that the second representation of the noise reduces an amount of noise and/or distortion relative to the first representation of the noise. In other examples, however, the device 110 may process the raw data to generate feature data, which may correspond to a third series of processed values derived from the first series and/or the second series of values without departing from the disclosure. Thus, the device 110 may generate feature data based on the raw data and/or the processed data without departing from the disclosure.

As used herein, "data" may refer to raw data, processed data, and/or feature data without departing from the disclosure. For example, the sensor data generated in step 130 may refer to raw sensor data, processed sensor data, and/or feature data derived from the raw sensor data and/or the processed sensor data without departing from the disclosure. Additionally or alternatively, the audio data generated in step 134 may refer to raw audio data, processed audio data, and/or feature data derived from the raw audio data and/or the processed audio data without departing from the disclosure.

Using the first feature data and the second feature data, the device 110 may generate (138) fused data, may determine (140) inference data by processing the fused data, and may perform (142) event/activity detection using the inference data. For example, the device 110 may concatenate the first feature data and the second feature data and process the fused data using one or more event detectors without departing from the disclosure. In some examples, the device 110 may process the fused data using two or more event detectors, enabling the device 110 to detect two different types of event/activity, although the disclosure is not limited thereto.

While FIG. 1 illustrates an example in which the device 110 generates the second feature data using the audio data, the disclosure is not limited thereto. Instead, the device 110 may generate second sensor data in step 134 and may generate the second feature data using the second sensor data in step 136 without departing from the disclosure. Thus, while FIG. 1 illustrates an example in which the fused data is generated based on sensor data and audio data, the disclosure is not limited thereto and the device 110 may generate the fused data based on first sensor data and second sensor data without departing from the disclosure.

An audio signal is a representation of sound and an electronic representation of an audio signal may be referred to as audio data, which may be analog and/or digital without departing from the disclosure. For ease of illustration, the disclosure may refer to either audio data (e.g., reference audio data or playback audio data, microphone audio data or input audio data, etc.) or audio signals (e.g., playback signals, microphone signals, etc.) without departing from the disclosure. For example, some audio data may be referred to as playback audio data, microphone audio data, error audio data, output audio data, and/or the like. Additionally or alternatively, this audio data may be referred to as audio signals such as a playback signal, microphone signal, error signal, output audio data, and/or the like without departing from the disclosure.

Additionally or alternatively, portions of a signal may be referenced as a portion of the signal or as a separate signal and/or portions of audio data may be referenced as a portion of the audio data or as separate audio data. For example, a first audio signal may correspond to a first period of time (e.g., 30 seconds) and a portion of the first audio signal corresponding to a second period of time (e.g., 1 second) may be referred to as a first portion of the first audio signal or as a second audio signal without departing from the disclosure. Similarly, first audio data may correspond to the first period of time (e.g., 30 seconds) and a portion of the first audio data corresponding to the second period of time (e.g., 1 second) may be referred to as a first portion of the first audio data or second audio data without departing from the disclosure. Audio signals and audio data may be used interchangeably, as well; a first audio signal may correspond to the first period of time (e.g., 30 seconds) and a portion of the first audio signal corresponding to a second period of time (e.g., 1 second) may be referred to as first audio data without departing from the disclosure.

In some examples, the audio data may correspond to audio signals in a time-domain. However, the disclosure is not limited thereto and the device 110 may convert these signals to a subband-domain or a frequency-domain prior to performing additional processing, such as acoustic echo cancellation (AEC), noise reduction (NR) processing, adaptive interference cancellation (AIC) processing, and/or the like. For example, the device 110 may convert the time-domain signal to the subband-domain by applying a band-pass filter or other filtering to select a portion of the time-domain signal within a desired frequency range. Additionally or alternatively, the device 110 may convert the time-domain signal to the frequency-domain using a Fast Fourier Transform (FFT) and/or the like.

As used herein, audio signals or audio data (e.g., microphone audio data, or the like) may correspond to a specific range of frequency bands. For example, the audio data may correspond to a human hearing range (e.g., 20 Hz-20 kHz), although the disclosure is not limited thereto.

As used herein, a frequency band corresponds to a frequency range having a starting frequency and an ending frequency. Thus, the total frequency range may be divided into a fixed number (e.g., 256, 512, etc.) of frequency ranges, with each frequency range referred to as a frequency band and corresponding to a uniform size. However, the disclosure is not limited thereto and the size of the frequency band may vary without departing from the disclosure.

Playback audio data $x_r(t)$ (e.g., far-end reference signal) corresponds to audio data that will be output by the loudspeaker(s) 114 to generate playback audio (e.g., echo signal $y(t)$). For example, the device 110 may stream music or output speech associated with a communication session (e.g., audio or video telecommunication). In some examples, the playback audio data may be referred to as far-end reference audio data, loudspeaker audio data, and/or the like without departing from the disclosure. For ease of illustration, the following description will refer to this audio data as playback audio data or reference audio data. As noted above, the playback audio data may be referred to as playback signal(s) $x_r(t)$ without departing from the disclosure.

Microphone audio data $x_m(t)$ corresponds to audio data that is captured by one or more microphones 112 prior to the device 110 performing audio processing such as AEC processing or beamforming. The microphone audio data $x_m(t)$ may include local speech s(t) (e.g., an utterance, such as near-end speech generated by the user), an "echo" signal y(t) (e.g., portion of the playback audio $x_r(t)$ captured by the microphones 112), acoustic noise n(t) (e.g., ambient noise in an environment around the device 110), and/or the like. As the microphone audio data is captured by the microphones 112 and captures audio input to the device 110, the microphone audio data may be referred to as input audio data, near-end audio data, and/or the like without departing from the disclosure. For ease of illustration, the following description will refer to this signal as microphone audio data. As noted above, the microphone audio data may be referred to as a microphone signal without departing from the disclosure.

An "echo" signal y(t) corresponds to a portion of the playback audio that reaches the microphones 112 (e.g., portion of audible sound(s) output by the loudspeaker(s) 114 that is recaptured by the microphones 112) and may be referred to as an echo or echo data y(t). If the device 110 includes a single loudspeaker 114, an acoustic echo canceller (AEC) may perform acoustic echo cancellation for one or more microphones 112. However, if the device 110 includes multiple loudspeakers 114, a multi-channel acoustic echo canceller (MC-AEC) may perform acoustic echo cancellation. For ease of explanation, the disclosure may refer to removing estimated echo audio data from microphone audio data to perform acoustic echo cancellation. The system 100 removes the estimated echo audio data by subtracting the estimated echo audio data from the microphone audio data, thus cancelling the estimated echo audio data. This cancellation may be referred to as "removing," "subtracting" or "cancelling" interchangeably without departing from the disclosure.

In some examples, the device 110 may perform echo cancellation using the playback audio data. However, the disclosure is not limited thereto, and the device 110 may perform echo cancellation using the microphone audio data, such as adaptive noise cancellation (ANC), adaptive interference cancellation (AIC), and/or the like, without departing from the disclosure. As used herein, isolated audio data corresponds to audio data after the device 110 performs audio processing (e.g., AEC processing, RES processing, AIC processing, ANC processing, and/or the like) to isolate the local speech s(t).

In some examples, such as when performing echo cancellation using ANC/AIC processing, the device 110 may include a beamformer that may perform audio beamforming on the microphone audio data to determine target audio data (e.g., audio data on which to perform echo cancellation). The beamformer may include a fixed beamformer (FBF) and/or an adaptive noise canceller (ANC), enabling the beamformer to isolate audio data associated with a particular direction. The FBF may be configured to form a beam in a specific direction so that a target signal is passed and all other signals are attenuated, enabling the beamformer to select a particular direction (e.g., directional portion of the microphone audio data). In contrast, a blocking matrix may be configured to form a null in a specific direction so that the target signal is attenuated and all other signals are passed (e.g., generating non-directional audio data associated with the particular direction).

The beamformer may generate fixed beamforms (e.g., outputs of the FBF) or may generate adaptive beamforms (e.g., outputs of the FBF after removing the non-directional audio data output by the blocking matrix) using a Linearly Constrained Minimum Variance (LCMV) beamformer, a Minimum Variance Distortion-less Response (MVDR) beamformer or other beamforming techniques. For example, the beamformer may receive audio input, determine six beamforming directions and output six fixed beamform outputs and six adaptive beamform outputs. In some examples, the beamformer may generate six fixed beamform outputs, six LCMV beamform outputs and six MVDR beamform outputs, although the disclosure is not limited thereto. Using the beamformer and techniques discussed below, the device 110 may determine target signals on which to perform acoustic echo cancellation using the AEC. However, the disclosure is not limited thereto and the device 110 may perform AEC without beamforming the microphone audio data without departing from the present disclosure. Additionally or alternatively, the device 110 may perform beamforming using other techniques known to one of skill in the art and the disclosure is not limited to the techniques described above.

As discussed above, the device 110 may include a microphone array having multiple microphones 112 that are laterally spaced from each other so that they can be used by audio beamforming components to produce directional audio signals. The microphones 112 may, in some instances, be dispersed around a perimeter of the device 110 in order to apply beampatterns to audio signals based on sound captured by the microphones. For example, the microphones 112 may be positioned at spaced intervals along a perimeter of the device 110, although the present disclosure is not limited thereto. In some examples, the microphone 112 may be spaced on a substantially vertical surface of the device 110 and/or a top surface of the device 110. Each of the microphones 112 is omnidirectional, and beamforming technology may be used to produce directional audio signals based on audio data generated by the microphones 112. In other embodiments, the microphones 112 may have directional audio reception, which may remove the need for subsequent beamforming.

Using the microphones 112, the device 110 may employ beamforming techniques to isolate desired sounds for purposes of converting those sounds into audio signals for speech processing by the system. Beamforming is the process of applying a set of beamformer coefficients to audio signal data to create beampatterns, or effective directions of gain or attenuation. In some implementations, these volumes may be considered to result from constructive and destructive interference between signals from individual microphones 112 in a microphone array.

The device 110 may include a beamformer that may include one or more audio beamformers or beamforming components that are configured to generate an audio signal that is focused in a particular direction (e.g., direction from which user speech has been detected). More specifically, the beamforming components may be responsive to spatially separated microphone elements of the microphone array to produce directional audio signals that emphasize sounds originating from different directions relative to the device 110, and to select and output one of the audio signals that is most likely to contain user speech.

Audio beamforming, also referred to as audio array processing, uses a microphone array having multiple microphones 112 that are spaced from each other at known distances. Sound originating from a source is received by each of the microphones 112. However, because each microphone is potentially at a different distance from the sound source, a propagating sound wave arrives at each of the microphones 112 at slightly different times. This difference in arrival time results in phase differences between audio signals produced by the microphones. The phase differences can be exploited to enhance sounds originating from chosen directions relative to the microphone array.

Beamforming uses signal processing techniques to combine signals from the different microphones so that sound signals originating from a particular direction are emphasized while sound signals from other directions are deemphasized. More specifically, signals from the different microphones 112 are combined in such a way that signals from a particular direction experience constructive interference, while signals from other directions experience destructive interference. The parameters used in beamforming may be varied to dynamically select different directions, even when using a fixed-configuration microphone array.

As described above, the device 110 may generate microphone audio data $x_m(t)$ using microphones 112. For example, a first microphone 112a may generate first microphone audio data $x_{m1}(t)$ in a time domain, a second microphone 112b may generate second microphone audio data $x_{m2}(t)$ in the time domain, and so on. As used herein, a time domain signal may be comprised of a sequence of individual samples of audio data, such that $x(t)$ denotes an individual sample that is associated with a time t.

While the microphone audio data $x(t)$ is comprised of a plurality of samples, in some examples the device 110 may group a plurality of samples and process them together. For example, the device 110 may group a number of samples together in a frame to generate microphone audio data $x(n)$. As used herein, microphone audio data $x(n)$ corresponds to the time-domain signal and identifies an individual frame (e.g., fixed number of samples s) associated with a frame index n.

Additionally or alternatively, the device 110 may convert microphone audio data $x(n)$ from the time domain to the frequency domain or subband domain. For example, the device 110 may perform Discrete Fourier Transforms (DFTs) (e.g., Fast Fourier transforms (FFTs), short-time Fourier Transforms (STFTs), and/or the like) to generate microphone audio data $X(n, k)$ in the frequency domain or the subband domain. As used herein, microphone audio data $X(n, k)$ corresponds to the frequency-domain signal and identifies an individual frame associated with frame index n and tone index k. Thus, while the microphone audio data $x(t)$ corresponds to time indexes, the microphone audio data $x(n)$ and the microphone audio data $X(n, k)$ corresponds to frame indexes.

A Fast Fourier Transform (FFT) is a Fourier-related transform used to determine the sinusoidal frequency and phase content of a signal and performing a FFT operation produces a one-dimensional vector of complex numbers. This vector can be used to calculate a two-dimensional matrix of frequency magnitude versus frequency. In some examples, the system 100 may perform FFT on individual frames of audio data and generate a one-dimensional and/or a two-dimensional matrix corresponding to the microphone audio data $X(n)$. However, the disclosure is not limited thereto and the system 100 may instead perform short-time Fourier transform (STFT) operations without departing from the disclosure. A short-time Fourier transform is a Fourier-related transform used to determine the sinusoidal frequency and phase content of local sections of a signal as it changes over time.

Using a Fourier transform, a sound wave such as music or human speech can be broken down into its component "tones" of different frequencies, each tone represented by a sine wave of a different amplitude and phase. Whereas a time-domain sound wave (e.g., a sinusoid) would ordinarily be represented by the amplitude of the wave over time, a frequency domain representation of that same waveform comprises a plurality of discrete amplitude values, where each amplitude value is for a different tone or "bin." So, for example, if the sound wave consisted solely of a pure sinusoidal 1 kHz tone, then the frequency domain representation would consist of a discrete amplitude spike in the bin containing 1 kHz, with the other bins at zero. In other words, each tone "k" is a frequency index (e.g., frequency bin). To illustrate an example, the system 100 may apply FFT processing to the time-domain microphone audio data $x(n)$, producing the frequency-domain microphone audio data $X(n,k)$, where the tone index "k" (e.g., frequency index) ranges from 0 to K and "n" is a frame index ranging from 0 to N. Thus, the history of the values across iterations is provided by the frame index "n", which ranges from 1 to N and represents a series of samples over time.

In some examples, the device 110 may perform a K-point FFT on a time-domain signal. For example, if the device 110 performs a 256-point FFT on a 16 kHz time-domain signal, the output is 256 complex numbers, where each complex number corresponds to a value at a frequency in increments of 16 kHz/256, such that there is 125 Hz between points, with point 0 corresponding to 0 Hz and point 255 corresponding to 16 kHz. Thus, each tone index in the 256-point FFT corresponds to a frequency range (e.g., subband) in the 16 kHz time-domain signal. While the example above refers to the frequency range being divided into 256 different subbands (e.g., tone indexes), the disclosure is not limited thereto and the system 100 may divide the frequency range into K different subbands (e.g., K indicates an FFT size). In addition, while the example described above refers to the tone index being generated using the K-point FFT operation, the disclosure is not limited thereto. Instead, the tone index may be generated using Short-Time Fourier Transform (STFT), generalized Discrete Fourier Transform (DFT) and/or other transforms known to one of skill in the art (e.g., discrete cosine transform, non-uniform filter bank, etc.) without departing from the disclosure.

The system 100 may include multiple microphones 112, with a first channel m corresponding to a first microphone 112a, a second channel (m+1) corresponding to a second microphone 112b, and so on until a final channel (M) that corresponds to microphone 112M. While some drawings illustrate four channels or eight channels, the disclosure is not limited thereto and the number of channels may vary. For the purposes of discussion, an example of system 100 includes "M" microphones 112 (M>1) for hands free near-end/far-end distant speech recognition applications.

While the examples described above refer to the microphone audio data $x_m(t)$, the disclosure is not limited thereto and the same techniques apply to the playback audio data $x_r(t)$ without departing from the disclosure. Thus, playback audio data $x_r(t)$ indicates a specific time index t from a series of samples in the time-domain, playback audio data $x_r(n)$ indicates a specific frame index n from series of frames in the time-domain, and playback audio data $X_r(n, k)$ indicates a specific frame index n and frequency index k from a series of frames in the frequency-domain.

Prior to converting the microphone audio data $x_m(n)$ and the playback audio data $x_r(n)$ to the frequency-domain, in some examples the device 110 may first perform time-alignment to align the playback audio data $x_r(n)$ with the microphone audio data $x_m(n)$. For example, due to nonlinearities and variable delays associated with sending the playback audio data $x_r(n)$ to external loudspeaker(s) using a wireless connection, the playback audio data $x_r(n)$ may not synchronized with the microphone audio data $x_m(n)$. This lack of synchronization may be due to a propagation delay (e.g., fixed time delay) between the playback audio data $x_r(n)$ and the microphone audio data $x_m(n)$, clock jitter and/or clock skew (e.g., difference in sampling frequencies between the device 110 and the loudspeaker(s)), dropped packets (e.g., missing samples), and/or other variable delays.

To perform the time alignment, the device 110 may adjust the playback audio data $x_r(n)$ to match the microphone audio data $x_m(n)$. For example, the device 110 may adjust an offset between the playback audio data $x_r(n)$ and the microphone audio data $x_m(n)$ (e.g., adjust for propagation delay), may add/subtract samples and/or frames from the playback audio data $x_r(n)$ (e.g., adjust for drift), and/or the like. In some examples, the device 110 may modify both the microphone audio data and the playback audio data in order to synchronize the microphone audio data and the playback audio data. However, performing nonlinear modifications to the microphone audio data results in first microphone audio data associated with a first microphone to no longer be synchronized with second microphone audio data associated with a second microphone. Thus, the device 110 may instead modify only the playback audio data so that the playback audio data is synchronized with the first microphone audio data, although the disclosure is not limited thereto.

In some examples, the device 110 may detect a tap event and perform a corresponding action. For example, the device 110 may interpret a detected tap event as an input to delay or end an alarm, turn a light switch on or off, turn music on or off, and/or the like, although the disclosure is not limited thereto. However, the disclosure is not limited thereto, and the device 110 may perform event detection without departing from the disclosure. For example, the device 110 may detect a typing event (e.g., user typing on a keyboard), detect mechanical operations (e.g., opening a door, operations performed by appliances, etc.), detect specific activity (e.g., chopping food in a kitchen), and/or the like, although the disclosure is not limited thereto.

Figure 2A:
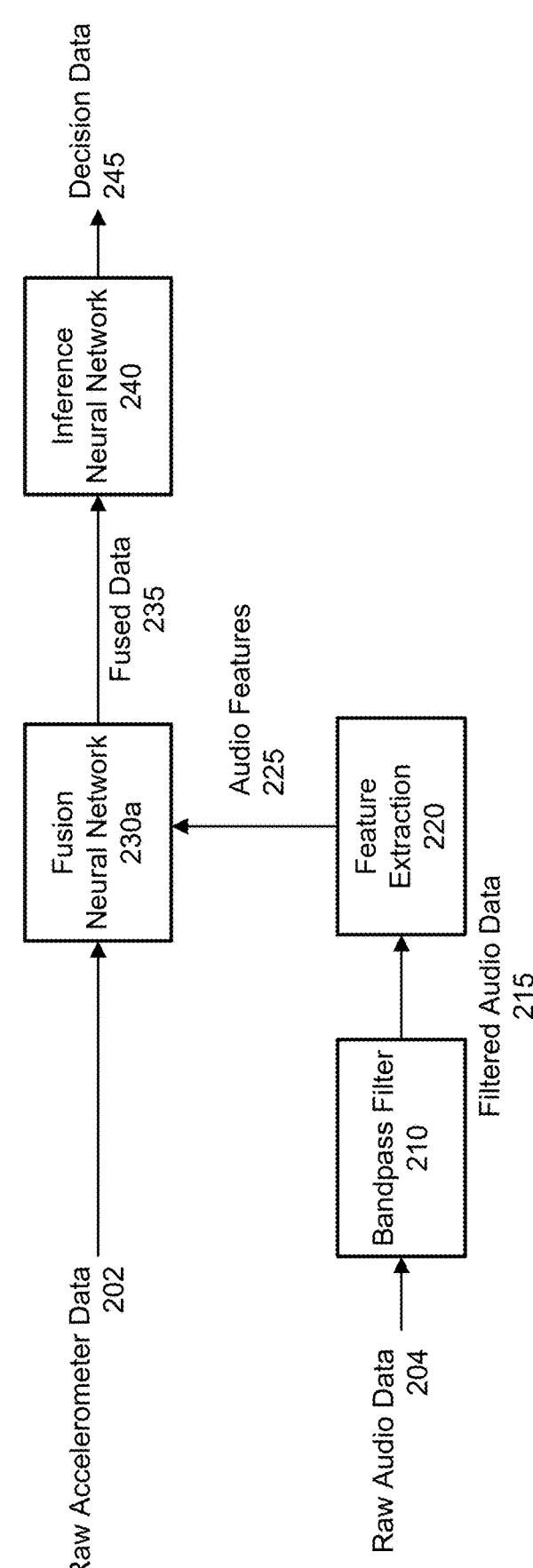
FIGS. 2A-2B illustrate example component diagrams for a tap detection pipeline and an event detection pipeline according to embodiments of the present disclosure.
Figure 2B:
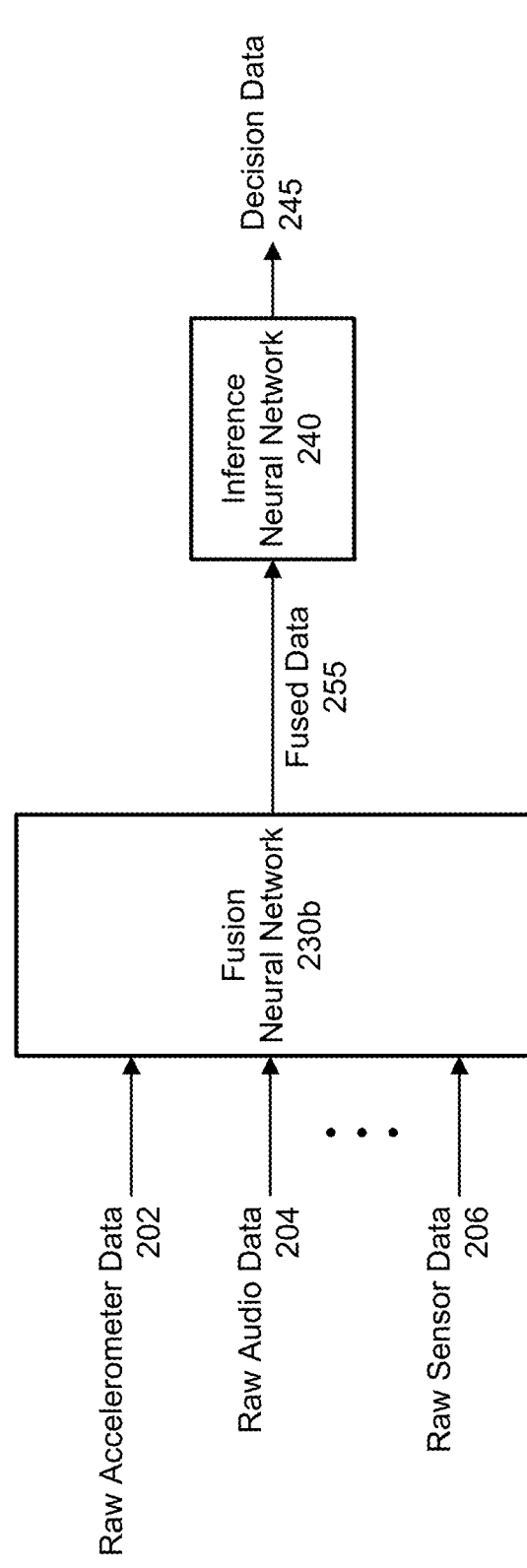

FIGS. 2A-2B illustrate example component diagrams for a tap detection pipeline and an event detection pipeline according to embodiments of the present disclosure. As described above, the device 110 may perform event detection using a combination of microphone audio data and sensor data, such as motion data generated by a motion sensor (e.g., accelerometer). In some examples, the device 110 may generate fused data by processing audio features and the motion data, as illustrated in FIG. 2A. In other examples, the device 110 may generate the fused data by processing raw audio data, raw accelerometer data, and/or additional sensor data, as illustrated in FIG. 2B. However, the disclosure is not limited thereto, and the device 110 may generate the fused data using raw audio data, raw accelerometer data, raw sensor data, processed audio data, processed accelerometer data, processed sensor data, feature data derived from any of the abovementioned data, and/or a combination thereof without departing from the disclosure. Depending on the inputs, a number of branches, a branch depth, and/or a number of event detectors may vary without departing from the disclosure.

As illustrated in FIG. 2A, a tap detection pipeline 200 may include components configured to perform a variety of processing to enable tap detection. For example, some of the components may perform feature extraction to generate features associated with the input data, fusion processing to combine the features and generate fused data, and/or event detection to detect an event using the fused data. In some examples, the tap detection pipeline 200 may perform feature extraction prior to performing fusion processing. For example, FIG. 2A illustrates an example in which the tap detection pipeline 200 includes a bandpass filter component 210 and a feature extraction component 220 configured to generate audio features. However, the disclosure is not limited thereto, and the tap detection pipeline 200 may perform fusion processing without these components without departing form the disclosure.

In some examples, raw accelerometer data 202 may be sampled at a first sampling rate (e.g., 400 Hz) and can be represented as a sequence of tuples as follows:

$$[(a_x[1], a_y[1], a_z[1]), (a_x[2], a_y[2], a_z[2]), \ldots] \qquad [1]$$

where $a_x[i]$, $a_y[i]$, and $a_z[i]$ denote linear accelerations along an x-axis, y-axis, and z-axis at i-th time index, respectively. Similarly, raw audio data 204 from M microphones may be sampled at a second sampling rate (e.g., 16 kHz) and can be represented at discrete time index j as:

$$x_m[j], m=1, \ldots, M \qquad [2]$$

While the second sampling rate of the raw audio data 204 is 40× higher compared to the first sampling rate of the raw accelerometer data 202, in some examples the feature extraction components may reduce the dimensionality of the audio signal via filtering and windowed root-mean-squared (RMS) averaging, although the disclosure is not limited thereto.

As illustrated in FIG. 2A, the bandpass filter component 210 may receive the raw audio data 204 corresponding to M microphones 112 and may perform bandpass filtering to generate filtered audio data 215. As taps are physical impulses exciting mechanical modes of the structure of the device 110, their energy can be isolated from irrelevant acoustic events (e.g., voices, music, etc.) via spectral filtering in the low-frequency band. For example, the bandpass filter component 210 may perform bandpass filtering using a first cutoff frequency (e.g., 20 Hz) and a second cutoff frequency (e.g., 120 Hz) in order to pass frequency bands within a first frequency range (e.g., 20 Hz-120 Hz, although the disclosure is not limited thereto) and attenuate frequency bands outside the first frequency range.

The bandpass filter component 210 may output the filtered audio data 215 to the feature extraction component 220, which may process the filtered audio data 215 to extract audio features 225. For example, the feature extraction component 220 may determine RMS amplitude values in non-overlapping windows of N samples each, as shown below:

$$R_m[i] = 20\log_{10}\left(\frac{1}{I_M}\sqrt{\frac{1}{N}\sum_{j=Ni}^{N(i+1)-1}[\hat{x}_m[j]]^2}\right) \qquad [3]$$

where N denotes a number of microphone samples per audio feature sample, $\tilde{x}_m(t)$ are the band-pass-filtered microphone signals (e.g., filtered audio data 215) for the M microphones 112, and IM is the maximum value of integer possible for a given bit-precision of the band-pass-filtered microphone signals $\tilde{x}_m(t)$. Using Equation [3], the second sampling rate (e.g., 16 kHz) associated with the filtered audio data 215 may be reduced to the first sampling rate (e.g., 400 Hz) associated with raw accelerometer data 202 based on the number of microphone samples N (e.g., N=40).

Thus, the RMS amplitude values $R_m[i]$ may share the second sampling rate (e.g., 400 Hz) with the raw accelerometer data 202, although the disclosure is not limited thereto.

Using the RMS amplitude values $R_m[i]$, the feature extraction component 220 may generate the audio features 225 by determining two metrics (e.g., two audio features). For example, the feature extraction component 220 may determine average RMS values $R[i]$ and inter-channel level difference (ILD) values $ILD[i]$. However, the disclosure is not limited thereto and the device 110 may generate the audio features 225 using other techniques without departing from the disclosure.

The feature extraction component 220 may calculate the average RMS values $R[i]$ as a mean of the RMS amplitude values $R_m[i]$ over all microphone channels, m E $\{1, \ldots, M\}$, as shown below:

$$R[i] = \frac{1}{M} \sum_{i=1}^{M} R_m[i] \mid \qquad [4]$$

While the RMS amplitude values $R_m[i]$ may be measured in decibels relative to full scale (dBFS), the average RMS values $R[i]$ may be measured in decibels (dB). As the microphones 112 may be closely spaced at a top of the device 110, the average RMS values $R[i]$ may be large when a user taps at the top of the device.

The feature extraction component 220 may determine the ILD values $ILD[i]$ by subtracting the quietest microphone channel from a loudest microphone channel, at each time step i, and scaling the difference by an attenuation function $\alpha(R)$, as shown below:

$$ILD[i] = \alpha(R[i]) \times \left[ \max_{m \in 1, \ldots, M} \{R_m[i]\} \cdots \min_{m \in \{1, \ldots, M\}} \{R_m[i]\} \right] \qquad [5]$$

where $\alpha(R)$ denotes an attenuation function to control an attenuation of the ILD values $ILD[i]$. For example, the attenuation function $\alpha(R)$ may be calculated as:

$$\alpha(R) = \frac{1}{1 + \exp\left[-\frac{(R - \epsilon)}{\gamma}\right]} \qquad [6]$$

where parameters $\epsilon$ and $\gamma$ control the level and rate at which the ILD values $ILD[i]$ are attenuated with decreasing average RMS values $R[i]$. In some examples, the device 110 may select a first parameter value (e.g., E=−80 dB) and a second parameter value (e.g., $\gamma$=5 dB) to ensure that the ILD value $ILD[i]$ is low when the overall average RMS value $R[i]$ is low, reducing the impact of noisy fluctuations on the ILD values $ILD[i]$ in the absence of a strong microphone signal. A tap event, however, inadvertently happens closer to one microphone than the others, resulting in a high ILD value $ILD[i]$.

While not illustrated in FIG. 2A, in some examples the device 110 may perform region-of-interest (ROI) detection prior to performing sensor fusion and tap detection. For example, the device 110 may preprocess the raw accelerometer data 202 and the audio features 225 to detect an ROI that satisfies a condition. Thus, the device 110 only performs sensor fusion and/or tap detection when an individual ROI satisfies the condition, ignoring input signals that don't satisfy the condition as non-tap events.

In some examples, the device 110 may associate a first number of samples of the input data (e.g., 200 samples) with each individual ROI on which to perform event detection. To illustrate an example, the device 110 may continuously buffer the raw accelerometer samples and the audio features (e.g., average RMS values $R[i]$ and ILD values $ILD[i]$) using a first window (e.g., 0.5 s window). Thus, the ROI on which to perform event detection may consist of 200 values for each of the five features (e.g., $a_x[i]$, $a_y[i]$, $a_z[i]$, $R[i]$, and $ILD[i]$ for i∈ $\{1, \ldots, 200\}$). However, the disclosure is not limited thereto and the number of samples associated with each ROI may vary without departing from the disclosure.

In some examples, the device 110 may send the ROI (e.g., portion of fused data 235) to an inference neural network component 240 for event detection if and only if the raw acceleration along a vertical axis ($a_y[i]$) exceeds a minimum threshold ($Y_{TH}$) for a candidate tap (e.g., $a_y[i] > Y_{TH}$ for at least one time index i). Otherwise, the device 110 may reject the ROI as a non-tap event without processing the fused data 235 using the inference neural network component 240. Thus, the device 110 may monitor the linear acceleration along the y-axis ($a_y[i]$) and send an ROI of 100 samples before and after the index i at which the linear acceleration $a_y[i]$ crosses the threshold $Y_{TH}$. However, the disclosure is not limited thereto, the device 110 may vary a number of samples included in the ROI, the threshold value ($Y_{TH}$), the axis being monitored (e.g., $a_x[i]$, $a_y[i]$, or $a_z[i]$), and/or the like without departing from the disclosure. Additionally or alternatively, the device 110 may skip performing ROI detection without departing from the disclosure. For example, the inference neural network component 240 may continuously process the fused data 235 without requiring a candidate ROI to first satisfy the condition.

If the device 110 determines that the ROI satisfies the condition and/or the device 110 skips performing ROI detection, a first fusion neural network component 230a may process the raw accelerometer data 202 and the audio features 225 to generate fused data 235. As will be described in greater detail below with regard to FIGS. 3B-3C, the first fusion neural network component 230a may use separate neural networks to independently process (e.g., extract features from) the raw accelerometer data 202 and the audio features 225 prior to generating fused data 235. For example, the first fusion neural network component 230a may apply a first filter to the raw accelerometer data 202 (e.g., process using a first neural network, such as a first set of convolutional layers) in order to generate accelerometer features, may apply a second filter to the audio features 225 (e.g., process using a second neural network, such as a second set of convolutional layers) to generate processed audio features, and then may concatenate the accelerometer features and the processed audio features to generate the fused data 235. This multi-branch approach improves an accuracy of tap detection and enables detection of additional tap gestures and/or other types of event/activity detection (e.g., typing detection). After generating the fused data 235, the first fusion neural network component 230a may output the fused data 235 to the inference neural network component 240.

As illustrated in FIG. 2A, the inference neural network component 240 may be configured to perform event detection by processing the fused data 235. For example, the inference neural network component 240 may include task-specific inference layers configured to generate decision data 245 indicating whether the event was detected in the fused data 235 (e.g., whether the ROI corresponds to a tap event). As will be described in greater detail below with regard to FIG. 3B, the inference neural network component 240 may apply a third filter to the fused data 235 (e.g., process using a third neural network, such as a third set of convolutional layers) in order to generate inference data and may process the inference data using an output layer (e.g., classification layer, dense layer, regression layer, etc.) to generate the decision data 245.

While FIG. 2A only illustrates a single inference neural network component 240, the disclosure is not limited thereto and the tap detection pipeline 200 may include multiple inference neural network components 240 without departing from the disclosure. Additionally or alternatively, the inference neural network component 240 may include multiple task-specific inference layers, enabling a single inference neural network component 240 to detect multiple tap events, gestures, typing events, and/or the like based on the fused data 235.

While FIGS. 2A-2B illustrate the fusion neural network component 230 separately from the inference neural network component 240, this is intended to conceptually illustrate an example and the disclosure is not limited thereto. Instead, the fusion neural network component 230 may correspond to a first portion of a neural network while the inference neural network component 240 may refer to a second portion of the neural network without departing from the disclosure. While the inference neural network component 240 is described with reference to generating inference data, the disclosure is not limited thereto and the inference neural network component 240 may perform feature refinement (e.g., generate features based on features represented in the fused data 235/255), inference, and/or additional processing without departing from the disclosure.

As described above and illustrated in greater detail below with regard to FIG. 4, the fusion neural network component 230 (e.g., first portion of the neural network) may include multiple branches, with a unique branch for each modality (e.g., type of sensor input). Thus, the fusion neural network component 230 may separately process each type of sensor input to extract features and generate feature data. As part of performing a fusion operation to generate the fused data 235/255, the fusion neural network component 230 may align the feature data between the multiple branches, such that the feature data shares the same time steps (e.g., fixed sample rate). Thus, the latent space has the same dimensionality across the feature data, regardless of a number of channels. In some examples, the fusion neural network component 230 may generate the fused data 235/255 by concatenating the feature data from each of the multiple branches, although the disclosure is not limited thereto and the fusion neural network component 230 may generate the fused data 235/255 using other techniques without departing from the disclosure.

In some examples, the fused data may include a first number of samples (e.g., 200 samples) and a second number of channels, which may vary depending on the number of branches and/or types of sensor input. For example, the fused data 235 may include three channels corresponding to the raw accelerometer data 202 and two channels corresponding to the audio features 225, such that the fused data 235 has first dimensions (e.g., 200 samples×5 channels). Additionally or alternatively, the fused data 255 may include three channels corresponding to the raw accelerometer data 202 and ten channels corresponding to the raw audio data 204, such that the fused data 255 has second dimensions (e.g., 200 samples×13 channels). However, the disclosure is not limited thereto and the first number of samples and/or the second number of channels may vary without departing from the disclosure.

As used herein, the fusion neural network component 230 may correspond to a trained model, such as a machine learning model, neural network, convolutional neural network (CNN), deep neural network (DNN), transformer network, multilayer perceptron (MLLP) network (e.g., fully connected network), feedforward artificial neural network, other architecture, and/or a combination thereof. In some examples, the fusion neural network component 230 may include multiple sensor-specific feature extraction branches, and each feature extraction branch may comprise similar architecture and/or different architecture without departing from the disclosure. For example, a first feature extraction branch may correspond to a CNN, while a second feature extraction branch may correspond to a transformer network, although the disclosure is not limited thereto. Additionally or alternatively, multiple feature extraction branches may use the same type of architecture (e.g., CNN, transformer network, etc.) but a number of layers, type of layers, and/or the like may vary without departing from the disclosure.

As described above and illustrated in greater detail below with regard to FIG. 5, the inference neural network component 240 (e.g., second portion of the neural network) may include multiple task-specific branches, with a unique branch for each decision output (e.g., type of decision). Thus, the inference neural network component 240 may separately process the fused data 235/255 to generate two or more decision outputs without departing from the disclosure.

In some examples, the inference neural network component 240 may be configured to perform event detection classification. For example, the inference neural network component 240 may include a predictive layer (e.g., classification layer) configured to select between discrete classification categories and/or determine whether an event is detected. However, the disclosure is not limited thereto, and the inference neural network component 240 may be configured to perform classification, regression, prediction, generation, other processing, and/or a combination thereof without departing from the disclosure. For example, a first task-specific inference branch may be configured to perform classification, while a second task-specific inference branch may be configured to perform a combination of classification and regression without departing from the disclosure.

As used herein, the inference neural network component 240 may correspond to a trained model, such as a machine learning model, neural network, CNN, DNN, transformer network, MLP network, feedforward artificial neural network, other architecture, and/or a combination thereof. In some examples, the inference neural network component 240 may include multiple task-specific inference branches, with each branch comprising similar architecture and/or different architecture without departing from the disclosure. For example, a first task-specific inference branch may correspond to a CNN, while a second task-specific inference branch may process the same fused data 235/255 but correspond to a transformer network, although the disclosure is not limited thereto. Additionally or alternatively, multiple task-specific inference branches may use the same type of architecture (e.g., CNN, transformer network, etc.) but a number of layers, type of layers, type of predictive layer (e.g., output layer), and/or the like may vary without departing from the disclosure.

While the tap detection pipeline 200 illustrated in FIG. 2A includes feature extraction components (e.g., bandpass filter component 210 and feature extraction component 220) prior to the first fusion neural network component 230*a*, such that the first fusion neural network component 230*a* receives the audio features (e.g., average RMS values R[i] and ILD values ILD[i]) as inputs, the disclosure is not limited thereto. As described above, the device 110 may generate the fused data 235 by processing the raw accelerometer data, the raw audio data, and/or additional sensor data without departing from the disclosure.

FIG. 2B illustrates an example of an event detection pipeline 250 configured to perform event detection. In the event detection pipeline 250, the inference neural network component 240 may perform event detection by processing fused data 255 to generate decision data 245. As the inference neural network component 240 was previously described above with regard to FIG. 2A, a redundant description is omitted.

As illustrated in FIG. 2B, the feature extraction components (e.g., bandpass filter component 210 and feature extraction component 220) are not included in the event detection pipeline 250. Instead, a second fusion neural network component 230*b* may receive the raw accelerometer data 202 and the raw audio data 204 prior to feature extraction. Additionally or alternatively, the second fusion neural network component 230*b* may receive additional sensor inputs, illustrated in FIG. 2B as raw sensor data 206. While the raw sensor data 206 is illustrated as a single input, the disclosure is not limited thereto and the second fusion neural network component 230*b* may receive separate raw sensor data 206 from two or more sensor components of the device 110 without departing from the disclosure.

In some examples, the second fusion neural network component 230*b* may receive the raw accelerometer data 202 and the raw audio data 204, described in greater detail above with regard to FIG. 2A, and may generate fused data 255 using only these two inputs. In other examples, the second fusion neural network component 230*b* may receive the raw accelerometer data 202, the raw audio data 204, and the raw sensor data 206 associated with one or more sensors and may generate the fused data 255 using these inputs. However, the disclosure is not limited thereto and the second fusion neural network component 230*b* may generate the fused data 255 based on the raw accelerometer data 202, the raw audio data 204, the raw sensor data 206, and/or a combination thereof without departing from the disclosure. For example, the second fusion neural network component 230*b* may generate the fused data 255 using the raw audio data 204 and the raw sensor data 206, but not the raw accelerometer data 202, without departing from the disclosure.

Additionally or alternatively, the second fusion neural network component 230*b* may receive features extracted from any of the raw accelerometer data 202, the raw audio data 204, and/or the raw sensor data 206 without departing from the disclosure. Thus, while the event detection pipeline 250 does not include the feature extraction components illustrated in FIG. 2A, the disclosure is not limited thereto and the second fusion neural network component 230*b* may generate the fused data 255 using the raw accelerometer data 202, the audio features 225, and the raw sensor data 206 without departing from the disclosure.

While the second fusion neural network component 230*b* may be configured to process a number of different inputs, the second fusion neural network component 230*b* may include a separate neural network branch for each unique input (e.g., discrete branch per modality). Thus, the second fusion neural network component 230*b* may include distinct branches configured to extract features from different sensing modalities. For example, the second fusion neural network component 230*b* may include sensing-modality-specific feature extraction layers, enabling the second fusion neural network component 230*b* to extract features independently for each input before generating the fused data 255.

Depending on the inputs, a number of branches, a branch depth, and/or a number of event detectors may vary without departing from the disclosure. For example, FIGS. 3B-3C illustrate examples with two input branches having uniform depth, FIG. 4 illustrates an example of two input branches with different branch depths, FIG. 5 illustrates an example of three or more branches with different branch depths, and FIG. 6 illustrates an example of varying a number of event detectors (e.g., performing task-specific processing using the shared fused data 255).

As described above with regard to FIG. 2A, in some examples the device 110 may associate a first number of samples of the input data (e.g., 200 samples) with each individual ROI on which to perform event detection. For example, the device 110 may continuously buffer the raw accelerometer samples and the audio features (e.g., average RMS values R[i] and ILD values ILD[i]), such that the ROI on which to perform event detection may consist of 200 values for each of the five features (e.g., $a_x[i]$, $a_y[i]$, $a_z[i]$, R[i], and ILD[i] for $i \in \{1, \ldots, 200\}$). Thus, the raw accelerometer data 202 may correspond to three channels of the first number of samples, such that accelerometer channels 302 have first dimensions (e.g., 1×200×3 input), while the audio features 225 may correspond to two channels of the first number of samples, such that audio channels 304 have second dimensions (e.g., 1×200×2 input).

Figures 3A, 3B:
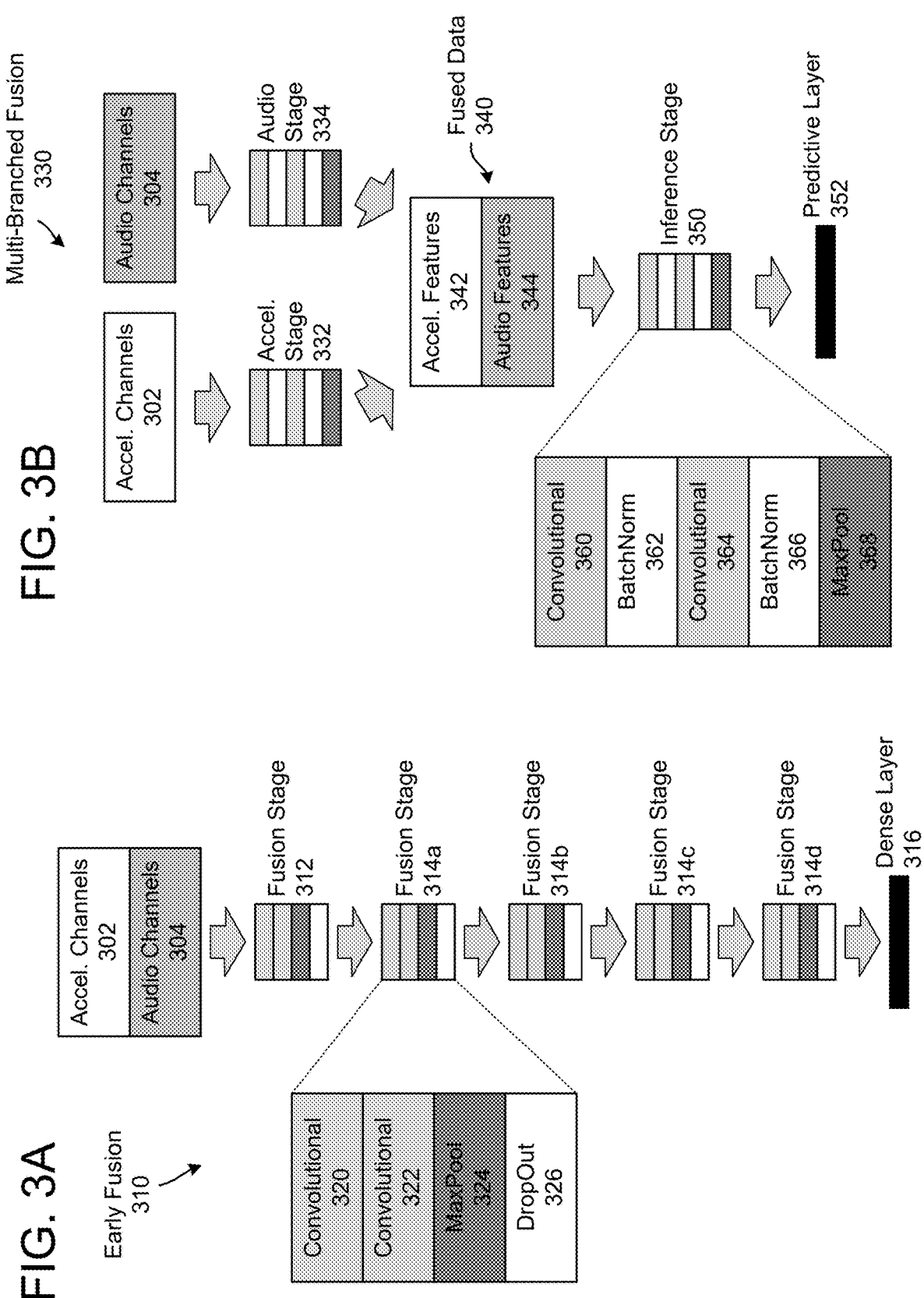
FIG. 3A is a component diagram illustrating an example of early fusion processing.
FIGS. 3B-3C illustrate example component diagrams for performing multi-branched fusion processing according to embodiments of the present disclosure.
Figure 3C:
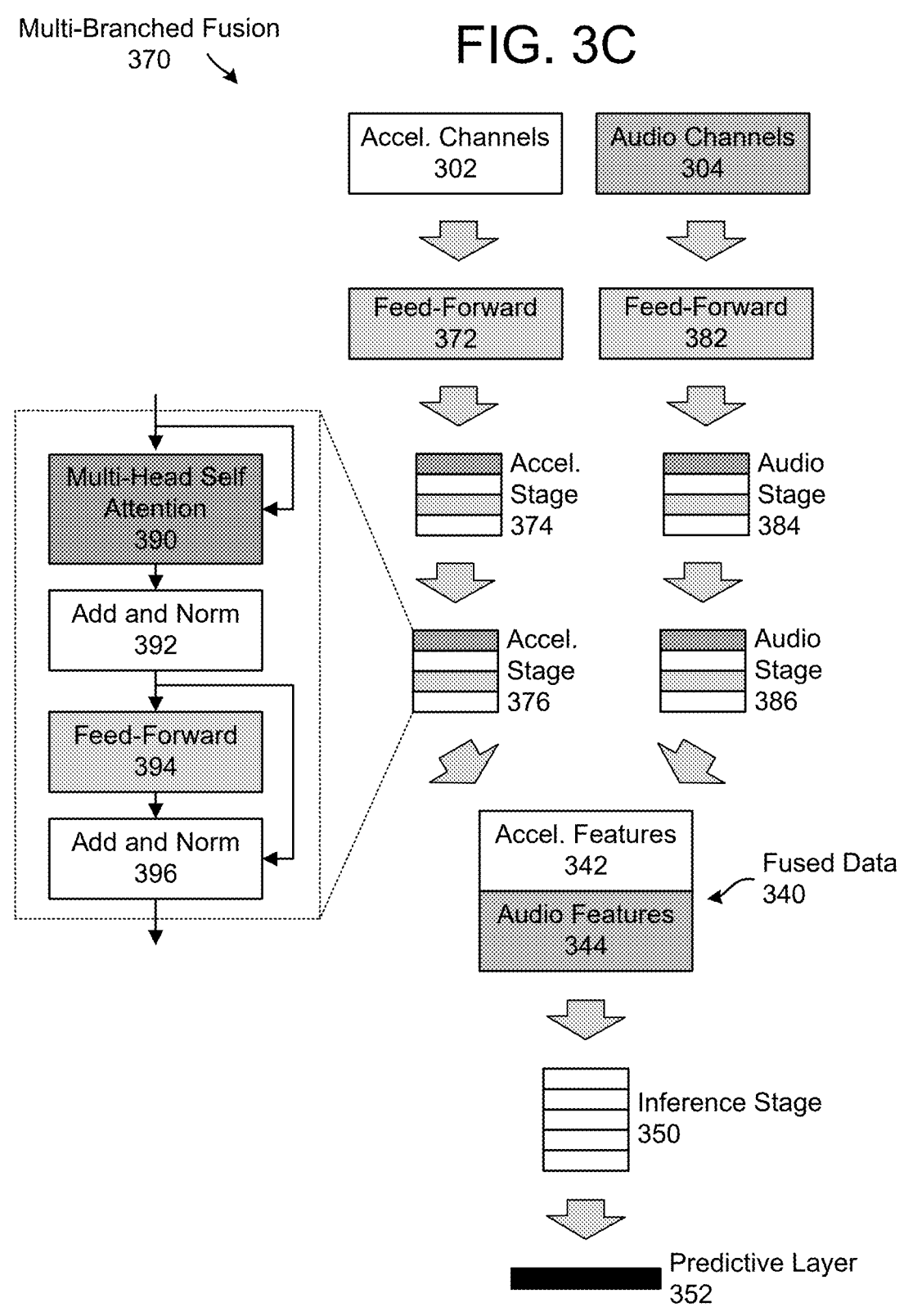

FIG. 3A is a component diagram illustrating an example of early fusion processing. In the early fusion 310 example illustrated in FIG. 3A, the accelerometer channels 302 and the audio channels 304 are concatenated at the input, prior to being processed by any of the convolutional layers. For example, the early fusion 310 example generates concatenated data having third dimensions (e.g., 1×200×5 input) and processes this concatenated data using ten convolutional layers, followed by a dense layer.

As illustrated in FIG. 3A, the ten convolutional layers are organized into five sets (e.g., five stages), each consisting of two consecutive convolutional layers followed by a max pooling layer and a dropout regularizer. For example, each stage may include a first convolutional layer 320, a second convolutional layer 322, a maxpool layer (e.g., MaxPool) 324, and a dropout regularizer layer (e.g., DropOut) 326. Thus, the concatenated data is processed by five sequential sets of convolutional layers, such as a first stage (e.g., fusion stage 312) and four additional stages (e.g., fusion stages 314*a*-314*d*), followed by a dense layer 316 for final tap detection classification. For example, the five sets of convolutional layers may process the concatenated data to generate inference data and the dense layer 316 may process the inference data to generate decision data indicating that the event was detected.

While each individual stage of the early fusion 310 example shares the same architecture, there may be differences between the stages. For example, a first stage (e.g., fusion stage 312) may include first convolutional layers that have a first number of filters (e.g., 16 filters/layer) and apply a first kernel (e.g., 1×7 kernel), while the following stages (e.g., fusion stages 314*a*-314*d*) may include second convolutional layers that have a second number of filters (e.g., 8 filters/layer) and apply a second kernel (e.g., 1×3 kernel), although the disclosure is not limited thereto.

FIGS. 3B-3C illustrate example component diagrams for performing multi-branched fusion processing according to embodiments of the present disclosure. As illustrated in FIG. 3B, the device 110 may perform multi-branched fusion 330 to extract features independently from each input. As described above with regard to FIGS. 2A-2B, the fusion neural network component 230 may include a separate neural network branch for each unique input. In the example of multi-branched fusion 330 illustrated in FIG. 3B, for example, the device 110 includes a first convolutional network branch associated with the accelerometer channels 302, which may correspond to the raw accelerometer data 202, and a second convolutional network branch associated with the audio channels 304, which may correspond to the audio features 225.

As described above with regard to FIG. 2A, in some examples the device 110 may associate a first number of samples of the input data (e.g., 200 samples) with each individual ROI on which to perform event detection. For example, the device 110 may continuously buffer the raw accelerometer samples and the audio features (e.g., average RMS values R[i] and ILD values ILD[i]), such that the ROI on which to perform event detection may consist of 200 values for each of the five features (e.g., $a_x[i]$, $a_y[i]$, $a_z[i]$, R[i], and ILD[i] for i∈{1, . . . , 200}). In this example, the raw accelerometer data 202 may correspond to three channels of the first number of samples, such that the accelerometer channels 302 have first dimensions (e.g., 1×200×3 input), while the audio features 225 may correspond to two channels of the first number of samples, such that the audio channels 304 have second dimensions (e.g., 1×200×2 input).

FIG. 3B illustrates an example of performing multi-branched fusion 330 with two input branches having uniform depth. For example, the first input branch (e.g., first convolutional network branch) may correspond to an accelerometer stage 332 configured to extract accelerometer features 342 from the accelerometer channels 302, while the second input branch (e.g., second convolutional network branch) may correspond to an audio stage 334 configured to extract audio features 344 from the audio channels 304. Both the accelerometer stage 332 and the audio stage 334 correspond to a set of convolutional layers, each consisting of two convolutional layers and a max pooling layer, with batch normalization being performed after every convolutional layer, as will be described in greater detail below. However, the disclosure is not limited thereto and the type of layers and/or number of layers may vary between the branches without departing from the disclosure.

As illustrated in FIG. 3B, the two separate convolutional branches extract the accelerometer features 342 and the audio features 344 independently. The device 110 may then concatenate these features along the channel dimension to generate fused data 340, which may correspond to a first number of channels (e.g., 16 channels) evenly split between the accelerometer features 342 and the audio features 344. However, the disclosure is not limited thereto and the device 110 may combine these features using other techniques and/or the first number of channels may be split unevenly without departing from the disclosure.

In the multi-branched fusion 330 example, the fused data 340 may be passed to another neural network (e.g., inference stage 350), followed by a predictive layer 352 for final tap detection classification. For example, the inference stage 350 correspond to another set of convolutional layers configured to process the fused data 340 to generate inference data and the predictive layer 352 may process the inference data to generate the decision data 245, although the disclosure is not limited thereto.

While the multi-branched fusion 330 example illustrated in FIG. 3B illustrates examples of performing event detection classification using the predictive layer 352, the disclosure is not limited thereto. In some examples, the predictive layer 352 may perform classification, regression, prediction, generation, other processing, and/or a combination thereof without departing from the disclosure.

As illustrated in FIG. 3B, the convolutional layers are organized in sets, which may include the same number of layers across (i) the input convolutional branches configured to extract features independently from each input and (ii) the inference branch configured to process the fused data 340, although the disclosure is not limited thereto. Thus, FIG. 3B illustrates an example in which the accelerometer stage 332, the audio stage 334, and the inference stage 350 correspond to the same architecture, comprising a first convolutional layer 360, a first batch normalization layer (e.g., BatchNorm) 362, a second convolutional layer 364, a second batch normalization layer (e.g., BatchNorm) 366, and a maxpool layer (e.g., MaxPool) 368. The convolutional layers 360/364 may perform one-dimensional (1D) or two-dimensional (2D) convolution operations without departing from the disclosure. In some examples, the device 110 may perform batch normalization after every convolutional layer so that the convolutional network may learn and appropriately adjust the scale for distinct audio features and/or accelerometer features before concatenating them together. While FIG. 3B illustrates an example of performing multi-branched fusion 330 using the convolutional layers 360/364, the disclosure is not limited thereto and the neural network may include other types of layers (e.g., feed-forward layers) without departing from the disclosure.

While FIG. 3B illustrates an example in which each individual stage of the convolutional network (e.g., individual filter) shares the same architecture, there may be differences between the stages. For example, the input convolutional branches (e.g., accelerometer stage 332 and audio stage 334) may include first convolutional layers that have a first number of filters (e.g., 8 filters/layer) and apply a first kernel (e.g., 1×7 kernel), while the inference branch (es) (e.g., inference stage 350) may include second convolutional layers that have the first number of filters and apply a second kernel (e.g., 1×3 kernel). However, the disclosure is not limited thereto and the first and second convolutional layers may vary without departing from the disclosure. Additionally or alternatively, while each individual stage of the convolutional network is shown as having the same set of convolutional layers, the device 110 may independently train each set of convolutional layers. Thus, the processing being performed by each individual stage may vary depending on the training data used to train the convolutional network.

As described above, the feature extraction branches and/or the inference branches may correspond to one or more types of architecture (e.g., CNN, transformer network, etc.), and a number of layers, type of layers, type of predictive layer (e.g., output layer), and/or the like may vary without departing from the disclosure. Thus, while the multi-branched fusion 330 example illustrates each stage including a set of five identical layers, the type of architecture, type of layers, number of layers, and/or the like may vary between individual stages and/or branches without departing from the disclosure.

As illustrated in FIG. 3C, the device 110 may perform multi-branched fusion 370 to extract features independently from each input using a transformer architecture without departing from the disclosure. For example, the first input branch (e.g., first network branch) may correspond to a first feed-forward layer 372, a first accelerometer stage 374, and a second accelerometer stage 376 collectively configured to extract the accelerometer features 342 from the accelerometer channels 302. Similarly, the second input branch (e.g., second network branch) may correspond to a second feed-forward layer 382, a first audio stage 384, and a second audio stage 386 collectively configured to extract the audio features 344 from the audio channels 304. While FIG. 3C illustrates an example of performing multi-branched fusion 370 with two input branches having uniform depth, the disclosure is not limited thereto and the type of layers and/or number of layers may vary between the branches without departing from the disclosure.

As illustrated in FIG. 3C, the multi-branched fusion 370 example may correspond to a transformer network that includes a number of layers organized in sets or stages. For example, FIG. 3C illustrates an example in which the first accelerometer stage 374, the second accelerometer stage 376, the first audio stage 384, and the second audio stage 386 correspond to the same architecture, which comprises a multi-head self attention layer 390, an addition and normalization (Add and Norm) layer 392, a feed-forward layer 394, and an addition and normalization (Add and Norm) layer 396. However, the disclosure is not limited thereto, and the individual layers and/or the number of layers may vary between the stages and/or branches without departing from the disclosure.

As illustrated in FIG. 3C, the two separate transformer network branches extract the accelerometer features 342 and the audio features 344 independently. The device 110 may then concatenate these features along the channel dimension to generate fused data 340, which may correspond to a first number of channels (e.g., 16 channels) evenly split between the accelerometer features 342 and the audio features 344. However, the disclosure is not limited thereto and the device 110 may combine these features using other techniques and/or the first number of channels may be split unevenly without departing from the disclosure.

As illustrated in FIG. 3C, in the multi-branched fusion 370 example the fused data 340 may be passed to another neural network (e.g., inference stage 350) configured to perform feature refinement and/or inference processing. While the inference stage 350 was described above with regard to FIG. 3B, the inference stage 350 is illustrated differently in FIG. 3C in order to indicate that it may correspond to any type of architecture, type of layers, number of layers, and/or the like without departing from the disclosure. Thus, the inference stage 350 may correspond to the inference neural network component 240, which is configured to generate the inference data as described above, and may be followed by a predictive layer 352 for final tap detection classification. For example, the inference stage 350 may process the fused data 340 to generate the inference data and the predictive layer 352 may process the inference data to generate the decision data 245, although the disclosure is not limited thereto. In some examples, the predictive layer 352 may perform classification, regression, prediction, generation, other processing, and/or a combination thereof without departing from the disclosure.

As illustrated in FIGS. 3B-3C, the multi-branched fusion 330/370 architecture is shallower than the early fusion 310 illustrated in FIG. 3A. For example, the early fusion 310 architecture included five stages (e.g., five sequential sets of convolutional layers) whereas the multi-branched fusion 330 architecture illustrates an example that only includes two stages (e.g., two sequential sets of convolutional layers) and the multi-branched fusion 370 architecture illustrates an example that only includes three stages (e.g., three sequential sets of layers). However, the disclosure is not limited thereto, and the device 110 may perform multi-branched fusion and/or event detection using additional stages without departing from the disclosure.

In the multi-branched fusion 330 example illustrated in FIG. 3B, the two separate network branches have the same depth, as the first input branch and the second input branch each include a single stage. Similarly, in the multi-branched fusion 370 example illustrated in FIG. 3C, the two separate network branches have the same depth, as the first input branch and the second input branch each include two stages. In addition, FIGS. 3B-3C illustrate the multi-branched network receiving audio channels 304 corresponding to the audio features 225 as an input. However, the disclosure is not limited thereto and the multi-branched network may receive the raw audio data 204 as an input without departing from the disclosure. Additionally or alternatively, the first input branch and the second input branch may have different branch depths without departing from the disclosure. For example, the first input branch may include a single stage while the second input branch may include additional stages in order to process the raw audio data 204.

FIG. 4 illustrates an example component diagram for performing multi-branched fusion processing with different branch depth according to embodiments of the present disclosure. As illustrated in FIG. 4, the device 110 may perform multi-branched fusion 400 to extract features independently from each input. For example, the device 110 includes a first neural network branch configured to process raw accelerometer data 402, which may correspond to the raw accelerometer data 202, along with a second neural network branch configured to process raw audio data 404, which may correspond to the raw audio data 204, although the disclosure is not limited thereto.

As described above, each of the feature extraction branches and/or the inference branches may correspond to one or more types of architecture (e.g., CNN, transformer network, etc.), and/or a number of layers, type of layers, type of predictive layer (e.g., output layer), and/or the like may vary without departing from the disclosure. Thus, while the multi-branched fusion 400 example illustrates each stage using a set of five layers, the type of architecture, type of layers, number of layers, and/or the like may vary between individual stages and/or branches without departing from the disclosure.

In the multi-branched fusion 400 example illustrated in FIG. 4, the input branches have different branch depths, such that the second neural network branch includes additional stages relative to the first neural network branch. For example, the first input branch (e.g., first neural network branch) may correspond to a single accelerometer stage 412 configured to extract the accelerometer features 342 from the raw accelerometer data 402, although the disclosure is not limited thereto. In contrast, the second input branch (e.g., second neural network branch) may correspond to a first audio stage 422, a second audio stage 424, and a third audio stage 426, which are collectively configured to extract the audio features 344 from the raw audio data 404. Thus, the first input branch includes a single stage (e.g., one set of layers) while the second input branch includes three stages (e.g., three sets of layers).

In this example, the raw accelerometer data 402 may correspond to three channels of the first number of samples, such that the raw accelerometer data 402 has the first dimensions (e.g., 1×200×3 input), while the raw audio data 404 may correspond to three microphone channels of a second number of samples (e.g., 8,000 samples), such that the raw audio data 404 has third dimensions (e.g., 1×8000×3 input). However, the disclosure is not limited thereto and the dimensions of and/or the number of samples included in the raw accelerometer data 402 and/or the raw audio data 404 may vary without departing from the disclosure.

As illustrated in FIG. 4, the two separate neural branches extract the accelerometer features 342 and the audio features 344 independently. The device 110 may then concatenate these features along the channel dimension to generate fused data 340, which may correspond to the first number of channels (e.g., 16 channels) evenly split between the accelerometer features 342 and the audio features 344, although the disclosure is not limited thereto. As described above with regard to FIG. 3B, the fused data 340 may be passed to another neural network (e.g., inference stage 350), followed by a predictive layer 352 for final tap detection classification. For example, the inference stage 350 may process the fused data 340 to generate inference data and the predictive layer 352 may process the inference data to generate the decision data 245, although the disclosure is not limited thereto.

While each individual stage of the neural network (e.g., individual filter) shares the same architecture, there may be differences between the stages. In some examples, the input neural branches (e.g., accelerometer stage 412 and audio stages 422/424/426) may include first layers that have a first number of filters (e.g., 8 filters/layer) and apply a first kernel (e.g., 1×7 kernel), while the inference branch(es) (e.g., inference stage 350) may include second layers that have the first number of filters and apply a second kernel (e.g., 1×3 kernel). However, the disclosure is not limited thereto and the first and second layers may vary without departing from the disclosure. For example, individual stages of the neural network may correspond to different architecture, different types of layers, and/or a different number of layers without departing from the disclosure. Additionally or alternatively, the device 110 may independently train each stage and/or branch of the neural network. Thus, the processing being performed by each individual stage and/or branch may vary depending on the training data used to train the neural network.

While FIG. 4 illustrates an example of performing multi-branched fusion using two input branches, the disclosure is not limited thereto. Instead, the device 110 may perform multi-branched fusion using three or more branches with varying branch depths without departing from the disclosure. Depending on the inputs, a number of branches and/or a branch depth may vary without departing from the disclosure. Thus, the device 110 may generate fused data by processing raw accelerometer data, raw audio data, and/or additional sensor data. Additionally or alternatively, the device 110 may generate the fused data by processing features extracted from any of the raw accelerometer data, the raw audio data, and/or the raw sensor data without departing from the disclosure. For example, the device 110 may generate the fused data using the raw accelerometer data, the raw audio data, the raw sensor data, features extracted from the raw accelerometer data, the raw audio data, and/or the raw sensor data, or any combination thereof, without departing from the disclosure.

Figure 5:
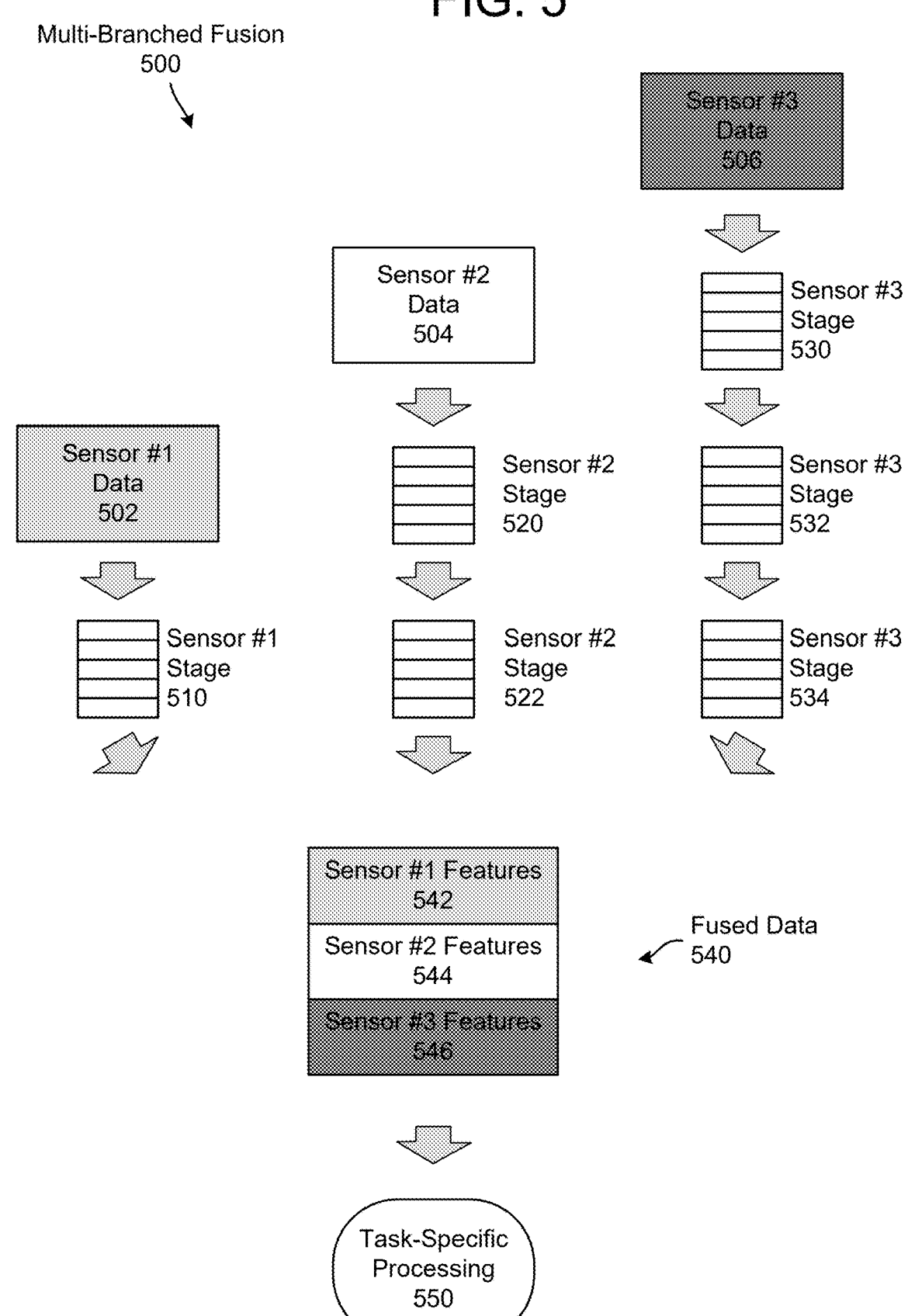
FIG. 5 illustrates an example component diagram for performing multi-branched fusion processing with multiple sensors according to embodiments of the present disclosure.
Figure 6:
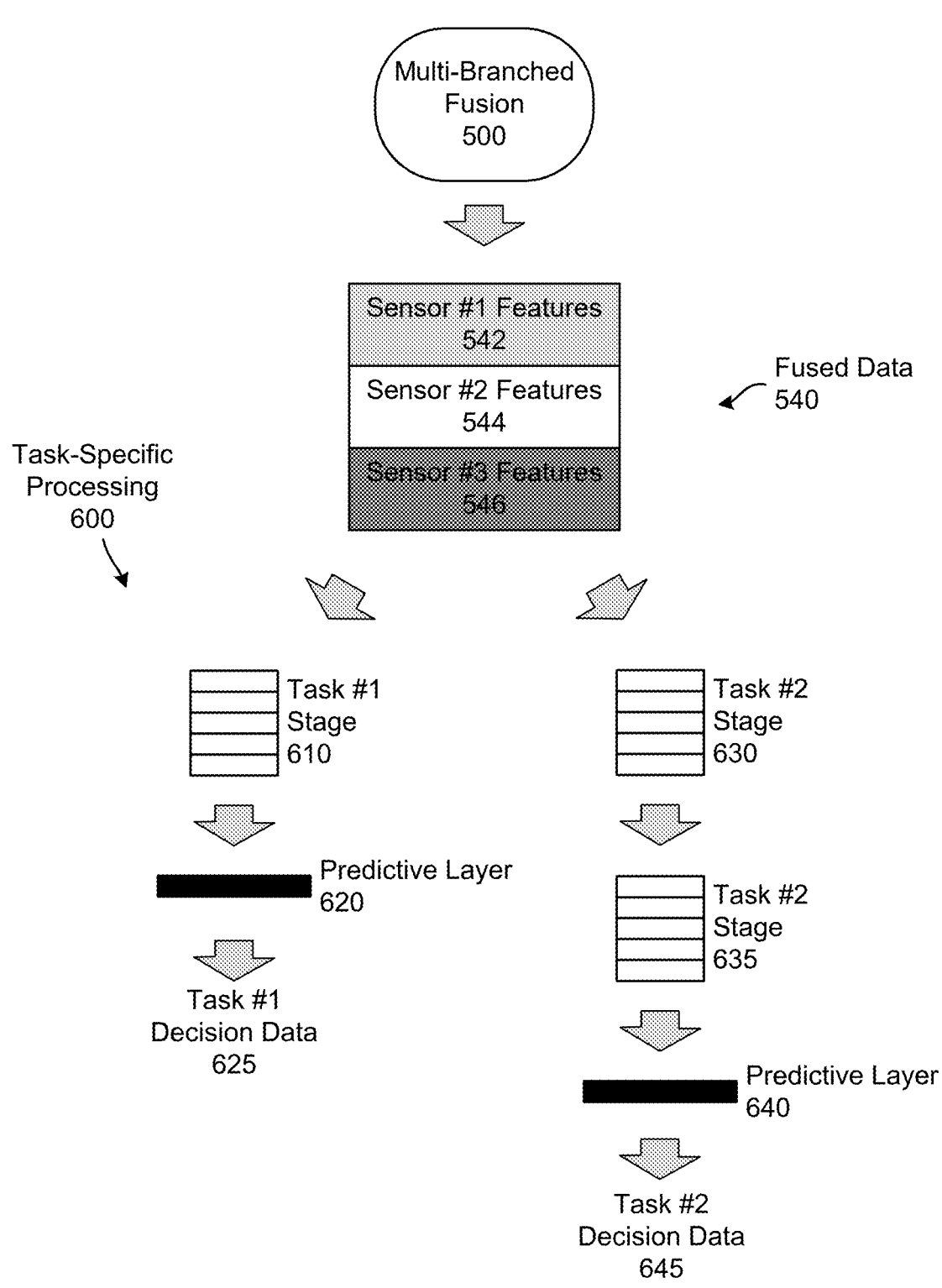
FIG. 6 illustrates an example component diagram for performing task-specific processing using the fused data according to embodiments of the present disclosure.

FIG. 5 illustrates an example component diagram for performing multi-branched fusion processing with multiple sensors according to embodiments of the present disclosure. As illustrated in FIG. 5, the device 110 may perform multi-branched fusion 500 to extract features independently from any number of inputs. For example, in the multi-branched fusion 500 example illustrated in FIG. 5, the device 110 includes a first neural network branch configured to process a first input (e.g., sensor #1 data 502), a second neural network branch configured to process a second input (e.g., sensor #2 data 504), and a third neural network branch configured to process a third input (e.g., sensor #3 data 506). However, the disclosure is not limited thereto and the device 110 may include additional neural network branches without departing from the disclosure.

As described above, "data" may refer to raw data, processed data, and/or feature data without departing from the disclosure. For example, the first input (e.g., sensor #1 data 502), the second input (e.g., sensor #2 data 504), and/or the third input (e.g., sensor #3 data 506) may correspond to raw data, processed data, and/or feature data derived from the raw data and/or the processed data without departing from the disclosure. To illustrate an example, the first input (e.g., sensor #1 data 502) may correspond to first raw sensor data, first processed sensor data, and/or first feature data derived from the first raw sensor data and/or the first processed sensor data. Similarly, the second input (e.g., sensor #2 data 504) may correspond to second raw sensor data, second processed sensor data, and/or second feature data derived from the second raw sensor data and/or the second processed sensor data. Finally, the third input (e.g., sensor #3 data 506) may correspond to raw audio data, processed audio data, and/or third feature data derived from the raw audio data and/or the processed audio data. However, the disclosure is not limited thereto and the first input (e.g., sensor #1 data 502), the second input (e.g., sensor #2 data 504), and/or the third input (e.g., sensor #3 data 506) may vary without departing from the disclosure.

In the multi-branched fusion 500 example illustrated in FIG. 5, the input branches have different branch depths, illustrating that the branch depth may vary without departing from the disclosure. For example, the first input branch (e.g., first neural network branch) may correspond to a single stage (e.g., sensor #1 stage 510) configured to extract first features (e.g., sensor #1 features 542) from the first input, although the disclosure is not limited thereto. In contrast, the second input branch (e.g., second neural network branch) may correspond to two stages (e.g., sensor #2 stage 520 and sensor #2 stage 522) collectively configured to extract second features (e.g., sensor #2 features 544) from the second input. Finally, the third input branch (e.g., third neural network branch) may correspond to three stages (e.g., sensor #3 stage 530, sensor #3 stage 532, and sensor #3 stage 534) collectively configured to extract third features (e.g., sensor #3 features 546) from the third input. Thus, the first input branch includes a single stage (e.g., one set of layers), the second input branch includes two stages (e.g., two sets of layers), and the third input branch includes three stages (e.g., three sets of layers). However, the disclosure is not limited thereto and the input branches may have any number of stages without departing from the disclosure, such that multiple input branches may have the same branch depth.

As illustrated in FIG. 5, the three separate input branches extract the first features 542, the second features 544, and the third features 546 independently. The device 110 may then concatenate these features along the channel dimension to generate fused data 540, although the disclosure is not limited thereto and the device 110 may combine the features using other techniques without departing from the disclosure. As will be described in greater detail below with regard to FIG. 6, the fused data 540 may be passed to task-specific processing 550, which may correspond to one or more event detectors without departing from the disclosure.

Individual stages of the neural network (e.g., individual filters) may share the same architecture or have different architecture without departing from the disclosure, and there may be differences between the stages without departing from the disclosure. Additionally or alternatively, the device 110 may independently train each stage and/or branch of the neural network without departing from the disclosure. Thus, the processing being performed by each individual stage may vary depending on the training data used to train the neural network.

FIG. 6 illustrates an example component diagram for performing task-specific processing using the fused data according to embodiments of the present disclosure. As described above, the multi-branched fusion 500 may include multiple neural branches configured to extract features independently to generate the fused data 540. As illustrated in FIG. 6, the device 110 may perform task-specific processing 600 using the fused data 540. For example, the device 110 may process the fused data 540 using two or more event detectors without departing from the disclosure.

As illustrated in FIG. 6, the device 110 may pass the fused data 540 to a first task-specific inference branch configured to perform first event detection. For example, the first task-specific inference branch may include one set of layers (e.g., task #1 stage 610) configured to generate first inference data, followed by a first predictive layer 620 configured to process the first inference data for first event detection classification. Thus, the first predictive layer 620 may generate first decision data (e.g., task #1 decision data 625) indicating whether the first event is represented in the fused data 540.

In addition, the device 110 may pass the fused data 540 to a second task-specific inference branch configured to perform second event detection. For example, the second task-specific inference branch may include two sets of layers (e.g., task #2 stage 630 and task #2 stage 635) collectively configured to generate second inference data, followed by a second predictive layer 640 configured to process the second inference data for second event detection classification. Thus, the second predictive layer 640 may generate second decision data (e.g., task #2 decision data 645) indicating whether the second event is represented in the fused data 540.

While the task-specific processing 600 example illustrated in FIG. 6 illustrates examples of performing event detection classification using the predictive layer 620/640, the disclosure is not limited thereto. In some examples, the predictive layer(s) 620/640 may perform classification, regression, prediction, generation, other processing, and/or a combination thereof without departing from the disclosure.

In the task-specific processing 600 example illustrated in FIG. 6, the inference branches have different depths (e.g., different number of stages), illustrating that the inference depth may vary without departing from the disclosure. However, the disclosure is not limited thereto and the inference branches may have any number of stages without departing from the disclosure, such that multiple inference branches may have the same number of stages. Additionally or alternatively, while the task-specific processing 600 example illustrates two event detectors (e.g., two task-specific inference branches) processing the fused data 540, the disclosure is not limited thereto and any number of event detectors may process the fused data 540 without departing from the disclosure.

Figure 7:
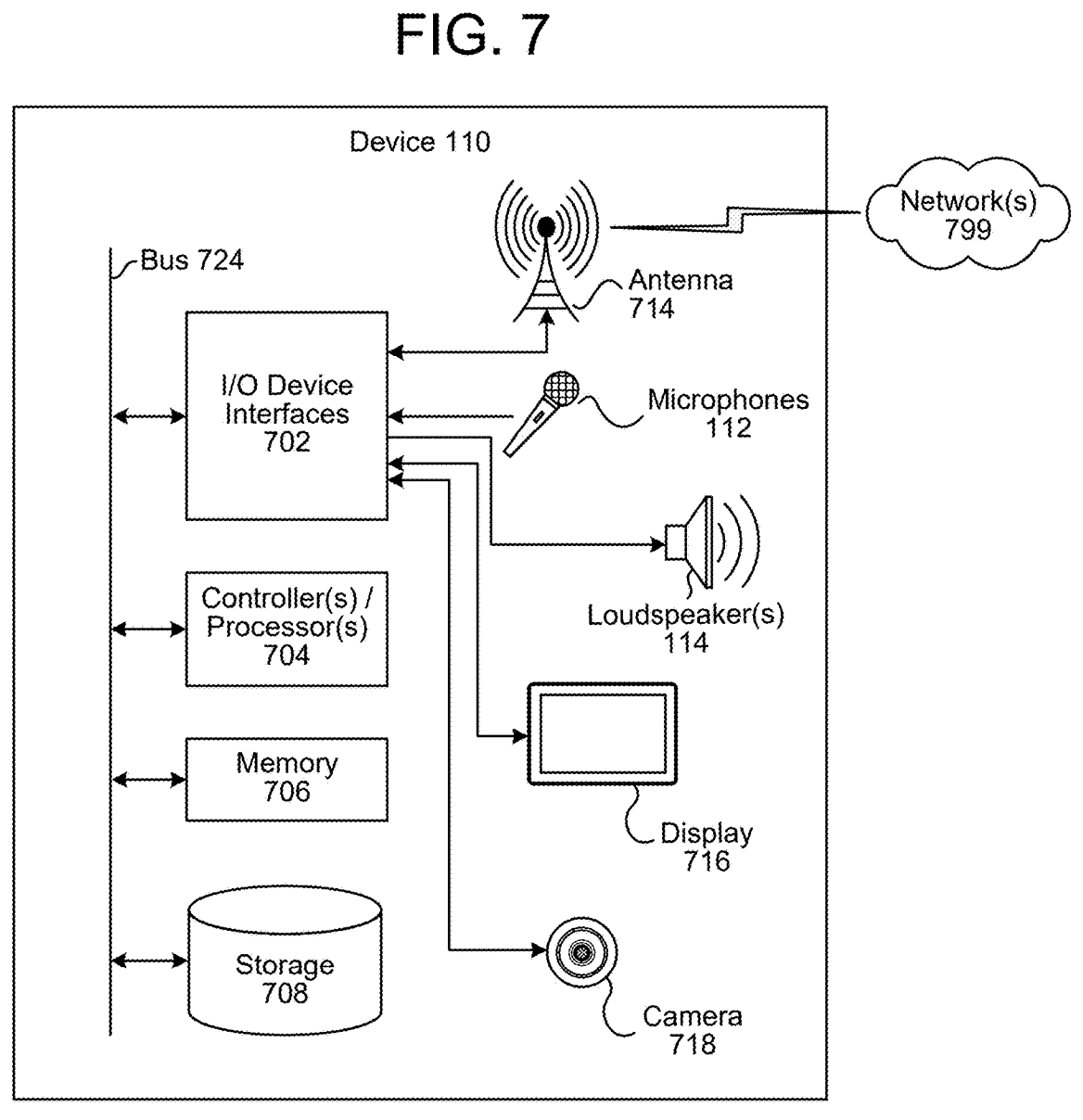

FIG. 7 is a block diagram conceptually illustrating a device 110 that may be used with the system. In operation, the system 100 may include computer-readable and computer-executable instructions that reside on the device 110, as will be discussed further below.

The device 110 may include one or more audio capture device(s), such as microphones 112 or an array of microphones. The audio capture device(s) may be integrated into the device 110 or may be separate. The device 110 may also include an audio output device for producing sound, such as loudspeaker(s) 712. The audio output device may be integrated into the device 110 or may be separate. In some examples the device 110 may include a display 716, but the disclosure is not limited thereto and the device 110 may not include a display or may be connected to an external device/display without departing from the disclosure.

The device 110 may include one or more controllers/processors (704), which may each include a central processing unit (CPU) for processing data and computer-readable instructions, and a memory (706) for storing data and instructions of the respective device. The memory (706) may individually include volatile random access memory (RAM), non-volatile read only memory (ROM), non-volatile magnetoresistive memory (MRAM), and/or other types of memory. The device 110 may also include a data storage component (708) for storing data and controller/processor-executable instructions. Each data storage component (708) may individually include one or more non-volatile storage types such as magnetic storage, optical storage, solid-state storage, etc. The device 110 may also be connected to removable or external non-volatile memory and/or storage (such as a removable memory card, memory key drive, networked storage, etc.) through respective input/output device interfaces (702).

Computer instructions for operating the device 110 and its various components may be executed by the respective device's controller(s)/processor(s) (704), using the memory (706) as temporary "working" storage at runtime. A device's computer instructions may be stored in a non-transitory manner in non-volatile memory (706), data storage component (708), or an external device(s). Alternatively, some or all of the executable instructions may be embedded in hardware or firmware on the respective device in addition to or instead of software.

The device 110 includes input/output device interfaces (702). A variety of components may be connected through the input/output device interfaces (702), such as the microphones 112, the loudspeaker(s) 712, and/or the display 716. The input/output interfaces (702) may include A/D converters for converting the output of the microphones 112 into microphone audio data, if the microphones 112 are integrated with or hardwired directly to the device 110. If the microphones 112 are independent, the A/D converters will be included with the microphones 112, and may be clocked independent of the clocking of the device 110. Likewise, the input/output interfaces 702 may include D/A converters for converting output audio data into an analog current to drive the loudspeaker(s) 712, if the loudspeaker(s) 712 are integrated with or hardwired to the device 110. However, if the loudspeaker(s) 712 are independent, the D/A converters will be included with the loudspeaker(s) 712 and may be clocked independent of the clocking of the device 110 (e.g., conventional Bluetooth loudspeakers).

Additionally, the device 110 may include an address/data bus (724) for conveying data among components of the respective device. Each component within a device 110 may also be directly connected to other components in addition to (or instead of) being connected to other components across the bus (724).

Referring to FIG. 7, the device 110 may include input/output device interfaces 702 that connect to a variety of components such as an audio output component such as loudspeaker(s) 712, a wired headset or a wireless headset (not illustrated), or other component capable of outputting audio. The device 110 may also include an audio capture component. The audio capture component may be, for example, microphones 112 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 716 for displaying content and/or a camera 718 to capture image data, although the disclosure is not limited thereto. The input/output device interfaces (702) may also include an interface for an external peripheral device connection such as universal serial bus (USB), FireWire, Thunderbolt or other connection protocol.

The device 110 may connect to one or more network(s) 799 through either wired and/or wireless connections. For example, the device 110 may connect to the network(s) 799 via an Ethernet port, through a wireless service provider (e.g., using a WiFi or cellular network connection), over a wireless local area network (WLAN) (e.g., using WiFi or the like), over a wired connection such as a local area network (LAN), and/or the like. The network(s) 799 may include a local or private network or may include a wide network such as the Internet.

As illustrated in FIG. 7, the input/output device interfaces 702 may connect to the network(s) 799 via antenna(s) 714. For example, the device 110 may connect to the network(s) 799 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 799, the system may be distributed across a networked environment. The I/O device interface (702) may also include communication components that allow data to be exchanged between devices such as different physical servers in a collection of servers or other components.

The components of the device 110 may include their own dedicated processors, memory, and/or storage. Alternatively, one or more of the components of the device 110 may utilize the I/O interfaces (702), processor(s) (704), memory (706), and/or data storage component (708) of the device 110, respectively. Thus, an ASR component may have its own I/O interface(s), processor(s), memory, and/or storage; an NLU component may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, as described herein, are illustrative, and may be located as a stand-alone device or may be included, in whole or in part, as a component of a larger device or system.

The concepts disclosed herein may be applied within a number of different devices and computer systems, including, for example, general-purpose computing systems, multimedia set-top boxes, televisions, stereos, radios, server-client computing systems, telephone computing systems, laptop computers, cellular phones, personal digital assistants (PDAs), tablet computers, wearable computing devices (watches, glasses, etc.), other mobile devices, etc.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented in different forms of software, firmware, and/or hardware, such as an acoustic front end (AFE), which comprises, among other things, analog and/or digital filters (e.g., filters configured as firmware to a digital signal processor (DSP)). Further, the teachings of the disclosure may be performed by an application specific integrated circuit (ASIC), field programmable gate array (FPGA), or other component, for example.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, the method comprising:

receiving, from an accelerometer component of a device, linear acceleration data representing motion of the device;

receiving audio data corresponding to audio captured by at least one microphone of the device;

processing the audio data to determine first data, the first data representing average root-mean-squared (RMS) values and inter-channel level difference (ILD) values;

determining, using the linear acceleration data and at least a first convolutional layer of a machine learning model, first feature data corresponding to the motion of the device, the first feature data representing first values derived from the linear acceleration data;

determining, using the first data and at least a second convolutional layer of the machine learning model, second feature data corresponding to the audio, the second feature data representing second values derived from the first data;

generating third feature data by concatenating the first feature data and the second feature data;

determining, using the third feature data and at least a third convolutional layer of the machine learning model, fourth feature data;

detecting, using the fourth feature data, a first physical interaction with the device, the first physical interaction comprising at least one of a swipe, tap, or button press; and performing a first action in response to detecting the first physical interaction.

2. The computer-implemented method of claim 1, further comprising:

determining, using the third feature data and at least a fourth convolutional layer of the machine learning model, fifth feature data;

detecting, using the fifth feature data, a second physical interaction with the device, the second physical interaction comprising at least one of a swipe, tap, or button press; and performing a second action in response to detecting the second physical interaction.

3. The computer-implemented method of claim 1, further comprising:

receiving second data corresponding to an antenna component of the device; and determining, using the second data and at least a fourth convolutional layer of the machine learning model, fifth feature data, wherein the third feature data is generated by concatenating the first feature data, the second feature data, and the fifth feature data.

4. The computer-implemented method of claim 1, wherein the linear acceleration data has a first sampling rate, the audio data has a second sampling rate that is different than the first sampling rate, and processing the audio data to determine the first data further comprises:

determining, using the audio data, a first portion of the first data by calculating the average RMS values using the first sampling rate; and determining, using the audio data, a second portion of the first data by calculating the ILD values using the first sampling rate.

5. A computer-implemented method, the method comprising:

determining first data corresponding to a first sensor component of a device, the first data representing output of the first sensor component during a first time window;

determining second data corresponding to audio captured by at least one microphone of the device, the second data representing a portion of the audio captured during the first time window;

determining, using the first data and at least a first neural network of a machine learning model, first feature data;

determining, using the second data and at least a second neural network of the machine learning model, second feature data;

generating third feature data using the first feature data and the second feature data;

determining, using the third feature data and at least a third neural network of the machine learning model, fourth feature data;

detecting, using the fourth feature data, a first event corresponding to a first physical interaction with the device; and performing a first action in response to detecting the first event.

6. The computer-implemented method of claim 5, wherein the first feature data is determined using a first set of convolutional layers that are included in the first neural network of the machine learning model, and the second feature data is determined using a second set of convolutional layers and a third set of convolutional layers that are included in the second neural network of the machine learning model.

7. The computer-implemented method of claim 5, further comprising:

determining third data corresponding to a second sensor component of the device, the third data representing output of the second sensor component during the first time window; and determining, using the third data and at least a fourth neural network of the machine learning model, fifth feature data, wherein the third feature data is generated using the first feature data, the second feature data, and the fifth feature data.

8. The computer-implemented method of claim 5, further comprising:

determining, using the third feature data and at least a fourth neural network of the machine learning model, fifth feature data;

detecting, using the fifth feature data, a second event corresponding to a second physical interaction with the device; and performing a second action in response to detecting the second event.

9. The computer-implemented method of claim 5, wherein determining the second data further comprises:

receiving, from a first microphone, first raw audio data including a first representation of the portion of the audio captured during the first time window;

receiving, from a second microphone, second raw audio data including a second representation of the portion of the audio captured during the first time window;

determining, using the first raw audio data and the second raw audio data, a first plurality of audio features, the first plurality of audio features representing root-mean-squared (RMS) values; and determining, using the first raw audio data and the second raw audio data, a second plurality of audio features, the second plurality of audio features representing inter-channel level difference (ILD) values, wherein the second data includes the first plurality of audio features and the second plurality of audio features.

10. The computer-implemented method of claim 5, wherein determining the second data further comprises:

receiving, from a first microphone, first raw audio data including a first representation of the portion of the audio captured during the first time window; and receiving, from a second microphone, second raw audio data including a second representation of the portion of the audio captured during the first time window, wherein the second data includes the first raw audio data and the second raw audio data.

11. The computer-implemented method of claim 5, wherein the first data corresponds to motion data having a first sampling rate, and determining the second data further comprises:

receiving audio data associated with the at least one microphone, the audio data having a second sampling rate that is different than the first sampling rate; and determining, using the audio data, the second data, wherein the second data has the first sampling rate.

12. The computer-implemented method of claim 5, wherein the first data corresponds to motion data and includes:

(i) a first plurality of values indicating a motion of the device along a first axis, (ii) a second plurality of values indicating a motion of the device along a second axis perpendicular to the first axis, and (iii) a third plurality of values indicating a motion of the device along a third axis perpendicular to the second axis.

13. A system comprising:

at least one processor; and memory including instructions operable to be executed by the at least one processor to cause the system to:

determine first data corresponding to a first sensor component of a device, the first data representing output of the first sensor component during a first time window;

determine second data corresponding to audio captured by at least one microphone of the device, the second data representing a portion of the audio captured during the first time window;

determine, using the first data and at least a first neural network of a machine learning model, first feature data;

determine, using the second data and at least a second neural network of the machine learning model, second feature data;

generate third feature data using the first feature data and the second feature data;

determine, using the third feature data and at least a third neural network of the machine learning model, fourth feature data;

detect, using the fourth feature data, a first event corresponding to a first physical interaction with the device; and perform a first action in response to detecting the first event.

14. The system of claim 13, wherein the first feature data is determined using a first set of convolutional layers that are included in the first neural network of the machine learning model, and the second feature data is determined using a second set of convolutional layers and a third set of convolutional layers that are included in the second neural network of the machine learning model.

15. The system of claim 13, wherein the memory further comprises instructions that, when executed by the at least one processor, further cause the system to:

determine third data corresponding to a second sensor component of the device, the third data representing output of the second sensor component during the first time window; and determine, using the third data and at least a fourth neural network of the machine learning model, fifth feature data, wherein the third feature data is generated using the first feature data, the second feature data, and the fifth feature data.

16. The system of claim 13, wherein the memory further comprises instructions that, when executed by the at least one processor, further cause the system to:

determine, using the third feature data and at least a fourth neural network of the machine learning model, fifth feature data;

detect, using the fifth feature data, a second event corresponding to a second physical interaction with the device; and perform a second action in response to detecting the second event.

17. The system of claim 13, wherein to determine the second data the memory further comprises instructions that, when executed by the at least one processor, further cause the system to:

receive, from a first microphone, first raw audio data including a first representation of the portion of the audio captured during the first time window;

receive, from a second microphone, second raw audio data including a second representation of the portion of the audio captured during the first time window;

determine, using the first raw audio data and the second raw audio data, a first plurality of audio features, the first plurality of audio features representing root-mean-squared (RMS) values; and determine, using the first raw audio data and the second raw audio data, a second plurality of audio features, the second plurality of audio features representing inter-channel level difference (ILD) values, wherein the second data includes the first plurality of audio features and the second plurality of audio features.

18. The system of claim 13, wherein to determine the second data, the memory further comprises instructions that, when executed by the at least one processor, further cause the system to:

receive, from a first microphone, first raw audio data including a first representation of the portion of the audio captured during the first time window; and receive, from a second microphone, second raw audio
data including a second representation of the portion of
the audio captured during the first time window,
wherein the second data includes the first raw audio data
and the second raw audio data.

19. The system of claim 13, wherein the first data corresponds to motion data having a first sampling rate, and to determine the second data the memory further comprises instructions that, when executed by the at least one processor, further cause the system to:

receive audio data associated with the at least one microphone, the audio data having a second sampling rate that is different than the first sampling rate; and
determine, using the audio data, the second data, wherein the second data has the first sampling rate.

20. The system of claim 13, wherein the first data corresponds to motion data and includes:

(i) a first plurality of values indicating a motion of the device along a first axis, (ii) a second plurality of values indicating a motion of the device along a second axis perpendicular to the first axis, and (iii) a third plurality of values indicating a motion of the device along a third axis perpendicular to the second axis.

\* \* \* \* \*